US012692958B2

(12) United States Patent
    Gay

(10) Patent No.: US 12,692,958 B2
(45) Date of Patent: Jul. 28, 2026

(54) VORTEX-INDUCED VIBRATION STRAKE ARRANGEMENTS

(71) Applicant: ADVANCED INNERGY LTD, Gloucester (GB)

(72) Inventor: Florian Vivien Gay, La Ciotat (FR)

(73) Assignee: Advanced Innergy Ltd, Gloucester (GB)

( * ) Notice: Subject to any disclaimer, the term of this patent is extended or adjusted under 35 U.S.C. 154(b) by 76 days.

(21) Appl. No.: 18/867,891

(22) PCT Filed: May 18, 2023

(86) PCT No.: PCT/GB2023/051319
     § 371 (c)(1),
     (2) Date: Nov. 21, 2024

(87) PCT Pub. No.: WO2023/227868
     PCT Pub. Date: Nov. 30, 2023

(65) Prior Publication Data
     US 2025/0146599 A1     May 8, 2025

(30) Foreign Application Priority Data

May 24, 2022    (EP) ..................................... 22305769

(51) Int. Cl.
     E21B 17/10        (2006.01)
     F16L 1/12         (2006.01)
(52) U.S. Cl.
     CPC ............ F16L 1/123 (2013.01); E21B 17/105 (2013.01)

(58) Field of Classification Search
     CPC ........ F15D 1/10; E21B 17/012; E21B 17/017; F16L 1/123; F16L 57/00
     See application file for complete search history.

(56) References Cited

U.S. PATENT DOCUMENTS 6,347,911 B1     2/2002  Blair et al.
7,147,402 B2 *  12/2006  Edfeldt ................... F16L 57/02
                                                         405/159

(Continued)

FOREIGN PATENT DOCUMENTS

WO      WO-2018231061 A1    12/2018
WO      WO-2023227868 A1    11/2023

OTHER PUBLICATIONS

"European Application No. 22305769.6, European Search Report dated Dec. 12, 2022", (Dec. 12, 2022), 8 pgs.

(Continued)

*Primary Examiner* — Benjamin F Fiorello
(74) *Attorney, Agent, or Firm* — Schwegman Lundberg & Woessner, P.A.

(57)            ABSTRACT

A vortex-induced vibration (VIV) strake arrangement is provided. The VIV strake arrangement comprises: a VIV strake shell for location on a conduit; and a VIV strake fin, for coupling to the VIV strake shell, comprising a flexible fin tip, a flexible first leg extending from the flexible fin tip and a flexible second leg extending from the flexible fin tip, wherein the VIV strake fin is shaped such that when the VIV strake fin is connected to the VIV strake shell and the VIV strake shell is located on the conduit, the flexible first and second legs extend from the flexible fin tip and define a void between the flexible first and second legs.

15 Claims, 25 Drawing Sheets

(56)     References Cited

U.S. PATENT DOCUMENTS

| | | | |
|---|---|---|---|
| 7,458,752 B2 * | 12/2008 | Esselbrugge | B63B 39/005 |
| | | | 405/211 |
| 8,256,993 B2 * | 9/2012 | Branchut | E21B 17/01 |
| | | | 405/224.2 |
| 9,523,247 B1 * | 12/2016 | Allen | E21B 17/1085 |
| 9,523,456 B1 * | 12/2016 | Allen | E21B 17/22 |
| 9,534,618 B1 | 1/2017 | Allen et al. | |
| 9,677,688 B1 | 6/2017 | Allen et al. | |
| 10,337,649 B1 * | 7/2019 | Dehne | E21B 17/012 |
| 10,344,785 B1 * | 7/2019 | Allen | F15D 1/10 |
| 2003/0007839 A1 * | 1/2003 | Brown | F16L 1/123 |
| | | | 405/211 |
| 2007/0231077 A1 * | 10/2007 | Burgess | E21B 17/01 |
| | | | 405/216 |
| 2011/0074074 A1 * | 3/2011 | Masters | F15D 1/10 |
| | | | 267/136 |
| 2015/0086276 A1 * | 3/2015 | Harbison | F16L 1/123 |
| | | | 264/261 |
| 2018/0339355 A1 * | 11/2018 | Forbes | C22C 29/067 |
| 2019/0218866 A1 * | 7/2019 | Allen | E21B 17/01 |
| 2020/0131858 A1 * | 4/2020 | Riley | E21B 17/017 |
| 2020/0141517 A1 * | 5/2020 | Esselbrugge | F15D 1/10 |
| 2023/0101296 A1 * | 3/2023 | Harbison | F16L 3/015 |
| | | | 405/157 |

OTHER PUBLICATIONS

"International Application PCT/GB2023/051319, International Search Report and Written Opinion dated Jul. 27, 2023", (Jul. 27, 2023), 10 pgs.

* cited by examiner

VORTEX-INDUCED VIBRATION STRAKE ARRANGEMENTS

PRIORITY CLAIM TO RELATED APPLICATIONS

This application is a U.S. national stage filing under 35 U.S.C. § 371 from International Application No. PCT/GB2023/051319, filed on 18 May 2023, and published as WO2023/227868 on 30 Nov. 2023, which claims the benefit under 35 U.S.C. 119 to European Application No. 22305769.6, filed on 24 May 2022, the benefit of priority of each of which is claimed herein, and which applications and publication are hereby incorporated herein by reference in their entirety.

FIELD OF THE INVENTION

Embodiments of the present invention relate to vortex-induced vibration strake arrangements. In particular, they relate to vortex-induced vibration strake arrangements for mitigating vibration of subsea conduits.

BACKGROUND TO THE INVENTION

A subsea conduit, such as a pipeline or cable, can be subject to vortex-induced vibrations caused by sea currents. This involves periodic forces being applied to a subsea conduit, causing it to vibrate. This can lead to the conduit accumulating fatigue damage.

BRIEF DESCRIPTION OF VARIOUS EMBODIMENTS OF THE INVENTION

According to various, but not necessarily all, embodiments of the invention there is provided a vortex-induced vibration (VIV) strake arrangement, comprising: a VIV strake shell for location on a conduit; and a VIV strake fin, for coupling to the VIV strake shell, comprising a flexible fin tip, a flexible first leg extending from the flexible fin tip and a flexible second leg extending from the flexible fin tip, wherein the VIV strake fin is shaped such that when the VIV strake fin is connected to the VIV strake shell and the VIV strake shell is located on the conduit, the flexible first and second legs extend from the flexible fin tip and define a void between the flexible first and second legs.

The VIV strake fin may be shaped such that when the VIV strake fin is connected to the VIV strake shell and the VIV strake shell is located on the conduit, at least a portion of the void is located outside the VIV strake shell.

The VIV strake fin may be shaped such that when the VIV strake fin is connected to the VIV strake shell and the VIV strake shell is located on the conduit, the flexible first and second legs diverge as they extend from the flexible fin tip.

The VIV strake fin may have a height dimension, a length dimension and a width dimension. The length dimension may be greater than the height dimension. The height dimension may be greater than the width dimension. The height dimension of the void may be at least 10% of the height dimension of the VIV strake fin.

The flexible first and second legs may diverge in the width dimension. Each of the first and second legs may define a recess shaped to accommodate a retainer for securing the VIV strake shell to a conduit.

At least part of the void may have a substantially triangular cross section.

The VIV strake fin may comprise at least one anchor arranged to resist extraction of the VIV strake fin from the VIV strake shell. The anchor may be at least one flange extending from at least one of the flexible first leg and the flexible second leg.

The VIV strake shell may comprise a first aperture for receiving at least part of the flexible first leg and a second aperture for receiving at least part of the flexible second leg. The first aperture may be a first elongate slot and the second aperture may be a second elongate slot. The VIV strake shell may comprise a tongue portion between the first and second apertures.

According to various, but not necessarily all, embodiments of the invention there is provided a vortex-induced vibration (VIV) strake fin, comprising: a flexible fin tip; and flexible first and second legs, extending from the flexible fin tip, shaped to define a void between the flexible first and second legs.

The flexible first and second legs may diverge as they extend from the flexible fin tip.

The VIV strake fin may have a height dimension, a length dimension and a width dimension. The length dimension may be greater than the height dimension. The height dimension may be greater than the width dimension. The height dimension of the void may be at least 10% of the height dimension of the VIV strake fin.

The flexible first and second legs may diverge in the width dimension. Each of the first and second legs may define a recess shaped to accommodate a retainer for securing a VIV strake shell to a conduit.

At least part of the void may have a substantially triangular cross section.

The VIV strake fin may comprise at least one anchor arranged to resist extraction of the VIV strake fin from the VIV strake shell. The anchor may be at least one flange extending from at least one of the flexible first leg and the flexible second leg.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
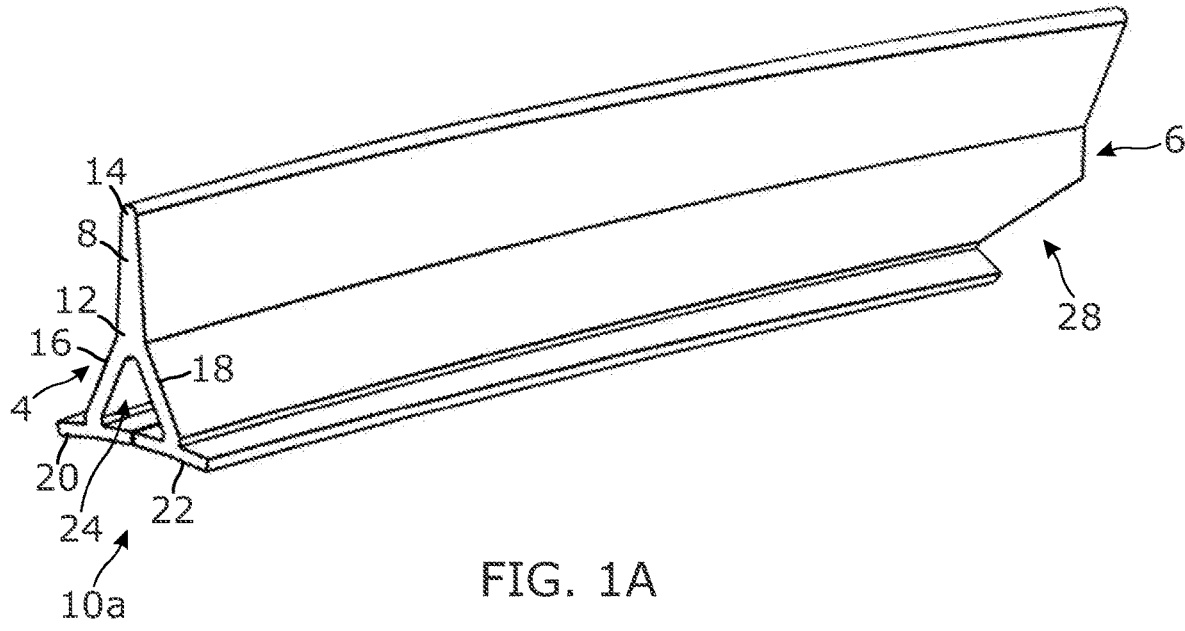
FIG. 1A illustrates a front perspective view of a first example of a vortex-induced vibration (VIV) strake fin.
Figure 1B:
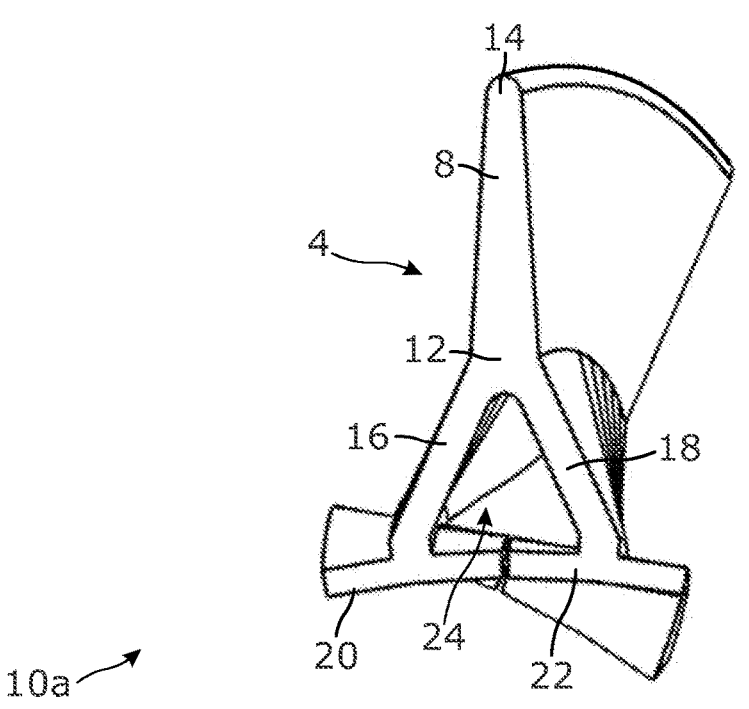
FIG. 1B illustrates a front view of the first example of the VIV strake fin.
Figure 1C:
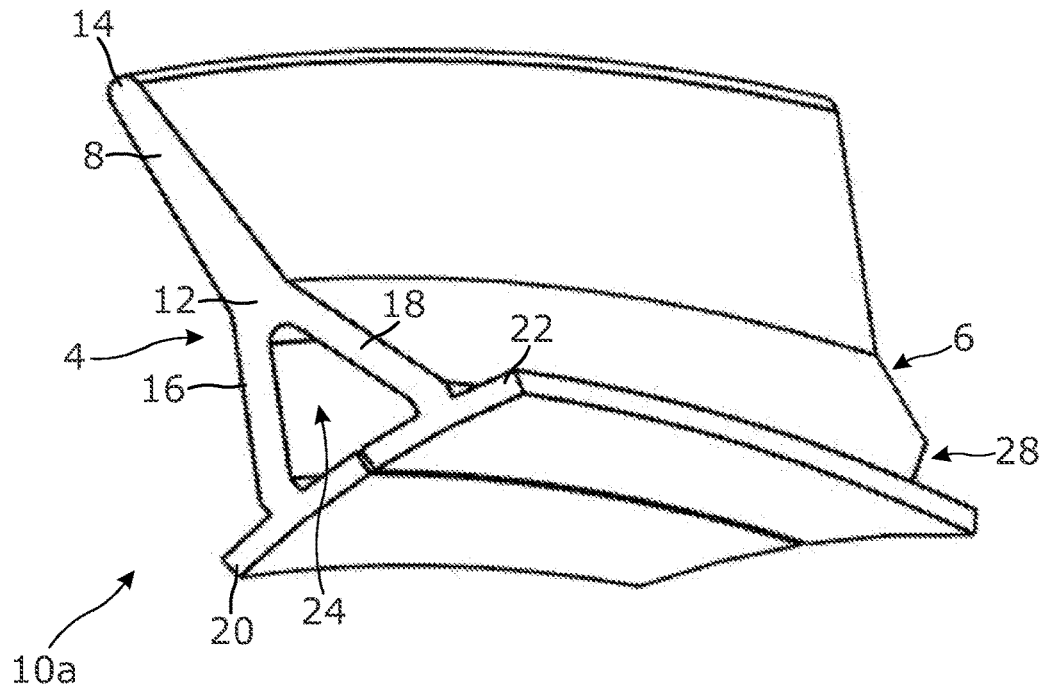
FIG. 1C illustrates an underside perspective view of the first example of the VIV strake fin.

Embodiments of the invention relate to vortex-induced vibration (VIV) strake arrangements 200a-b, 300 for subsea conduits 82 which suppress vortex-induced vibrations. The VIV strake arrangement 200a, 200b, 300 may include VIV strake fins 10a-b, 100a-e that are arranged to suppress the vortex-induced vibrations.

A ship may have an onboard factory for laying a subsea conduit 82. The conduit 82 be a pipeline for conveying a hydrocarbon mixture such as crude oil or natural gas. Alternatively, the conduit 82 could be telecommunications cable comprising one or more optical fibers for conveying telecommunications signals, or an electrical cable such as a high voltage cable for conveying electrical power from a wind turbine. The conduit 82 could be an umbilical including one or more different types of cable.

Portions of conduit may be welded from head to tail to form the conduit 82. A VIV strake arrangement 200a-b, 300 may be fitted to the conduit 82 onboard the ship.

The onboard factory may include rollers for supporting the conduit 82 as it is moved along the ship. The VIV strake arrangement 200a-b, 300 fitted to the conduit 82 may have to pass along the rollers as the conduit 82 is moved. If the VIV strake fins 10, 100 of the arrangement 200a-b, 300 are damaged prior to laying, the effectiveness of the arrangement 200a-b, 300 in suppressing the vortex-induced vibrations will be reduced. Damage might occur due to the weight placed on the fins 10a-b, 100a-d as the conduit 82 passes along the rollers, causing deformation of the fins 10a-b, 100a-d.

The VIV strake arrangements 200a-b, 300 described below comprise flexible fins 10a-b, 100a-d that include flexible legs 16, 18, 116, 118, 119 that define at least one void 24, 124. This enables the flexible legs 16, 18, 116, 118, 119 to temporarily flex into the void 24, 124 as a conduit 82 including the arrangement 200, 300 is moved along the rollers onboard a ship. Advantageously, this helps to avoid permanent damage being caused to the fins 10a-b, 100a-d, providing a more effective VIV strake arrangement 200a-b, 300 in use.

FIGS. 1A to 1E illustrate a front perspective, front, underside perspective, side and rear perspective views of a first example of a vortex-induced vibration VIV strake fin 10a.

The VIV strake fin 10a comprises a flexible fin tip 8, a flexible first leg 16 and a flexible second leg 18. The fin tip 8, the first leg 16 and the second leg 18 may be integrally formed from the same flexible material. The flexible material may, for example, be a flexible polymer material such as polyurethane (PU) or polyvinyl chloride (PVC), a rubber material such as ethyl propylene diene terpolymer (EPDM) rubber or a silicone rubber. The Young's modulus of the flexible material may, for example, be 1 to 15 MPa.

Each of the legs 16, 18 extends from the fin tip 8. The illustrated fin tip 8 has proximal end 12, which is proximal to the legs 16, 18, and a distal end 14, which is distal from the legs 16, 18. Each of the legs 16, 18 extends from the proximal end 12 of the fin tip 8.

The legs 16, 18 define at least one void 24 therebetween. The legs 16, 18 diverge from each other as they extend away from the fin tip 8 to define the void 24. At least a portion of the inner surface of the legs 16, 18 defines the void 24.

As the legs 16, 18 diverge away from each other, the width of the void 24 increases. The void 24 has a substantially triangular cross-section in the illustrated example, but need not in other examples. In this example the legs 16, 18 diverge substantially linearly, as shown in the illustrations. In other examples, however, the legs 16, 18 could be curved.

The illustrated VIV strake fin 10a comprises first and second anchors 20, 22. Each of these anchors 20, 22 could also be termed a foot, base, projection or flange. In the illustrated example, the first anchor 20 is located on and extends from the first leg 16, and the second anchor 22 is located on and extends from the second leg 18. The first and second anchors 20, 22 are configured to hold the VIV strake fin 10a in position in a VIV strake shell 40a/VIV strake arrangement 200a and resist extraction of the fin 10a from the shell 40a/arrangement 200a. This is described in further detail below.

Each of the illustrated anchors 20, 22 is positioned at a distal end of a leg 16, 18. The distal end of a leg 16, 18 is distal from the fin tip 8. The proximal end of a leg is proximal to the fin tip 8, and connected to the proximal end 12 of the fin tip 8. While a plurality of anchors 20, 22 is shown in the FIGs, in other examples a single anchor could be provided that interconnects the legs 16, 18 at their distal ends.

The VIV strake fin 10a has a first face 4 and a second face 6. Each of the first and second faces 4, 6 includes an aperture/entrance to the void 24. In the illustrated example, the void 24 extends through the VIV strake fin 10a from the first face 4 to the second face 6.

The VIV strake fin 10a has a length dimension which extends from the first face 4 to the second face 6. The length dimension may be the longest extent of the VIV strake fin 10a. The VIV strake fin 10a has a height dimension which extends from the anchors 20, 22 to the distal end 14 of the fin tip 8. The height dimension may be orthogonal to the length dimension. The VIV strake fin 10a has a width dimension which may be orthogonal to the length dimension and/or the height dimension. The legs 16, 18 diverge in the width dimension.

The length dimension may be greater than the height and width dimensions. The height dimension might or might not be greater than the width dimension.

In some embodiments, the extent of the void 24 may be such that the void 24 has a height dimension that is at least 10% of the height dimension of the VIV strake fin 10a as a whole. The void 24 may have a height dimension that is at least 20% or 30% of the height dimension of the fin 10a.

Figure 1D:
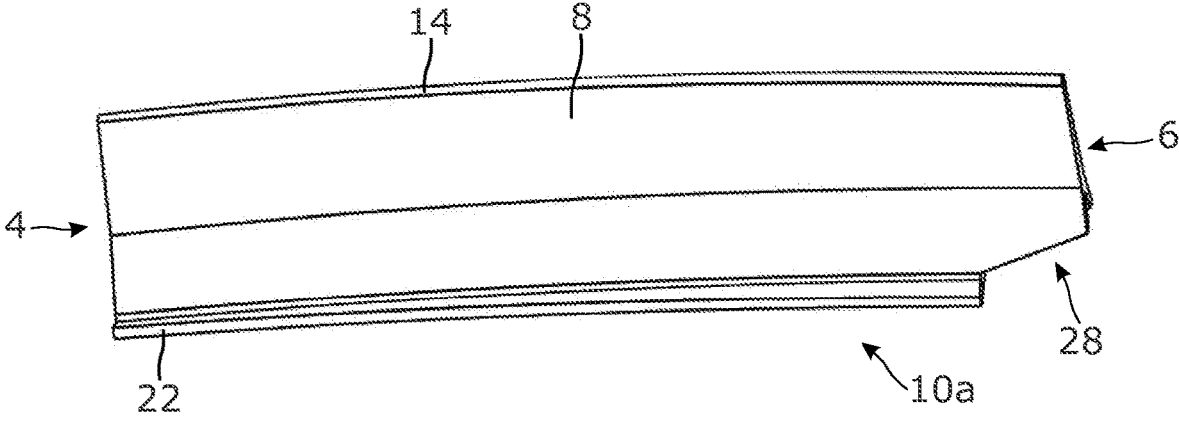
FIG. 1D illustrates a side view of the first example of the first VIV strake fin.

As best seen in FIGS. 1A, 1D and in particular 1E, each of the legs 16, 18 may include a recess 26, 28. In this example, the recesses 26, 28 are located at the second face 6 of the fin 10a. The recesses 26, 28 are shaped to accommodate a retainer 80 for securing a VIV strake shell 40a to a conduit. This is described in further detail below.

Figures 1E, 2A:
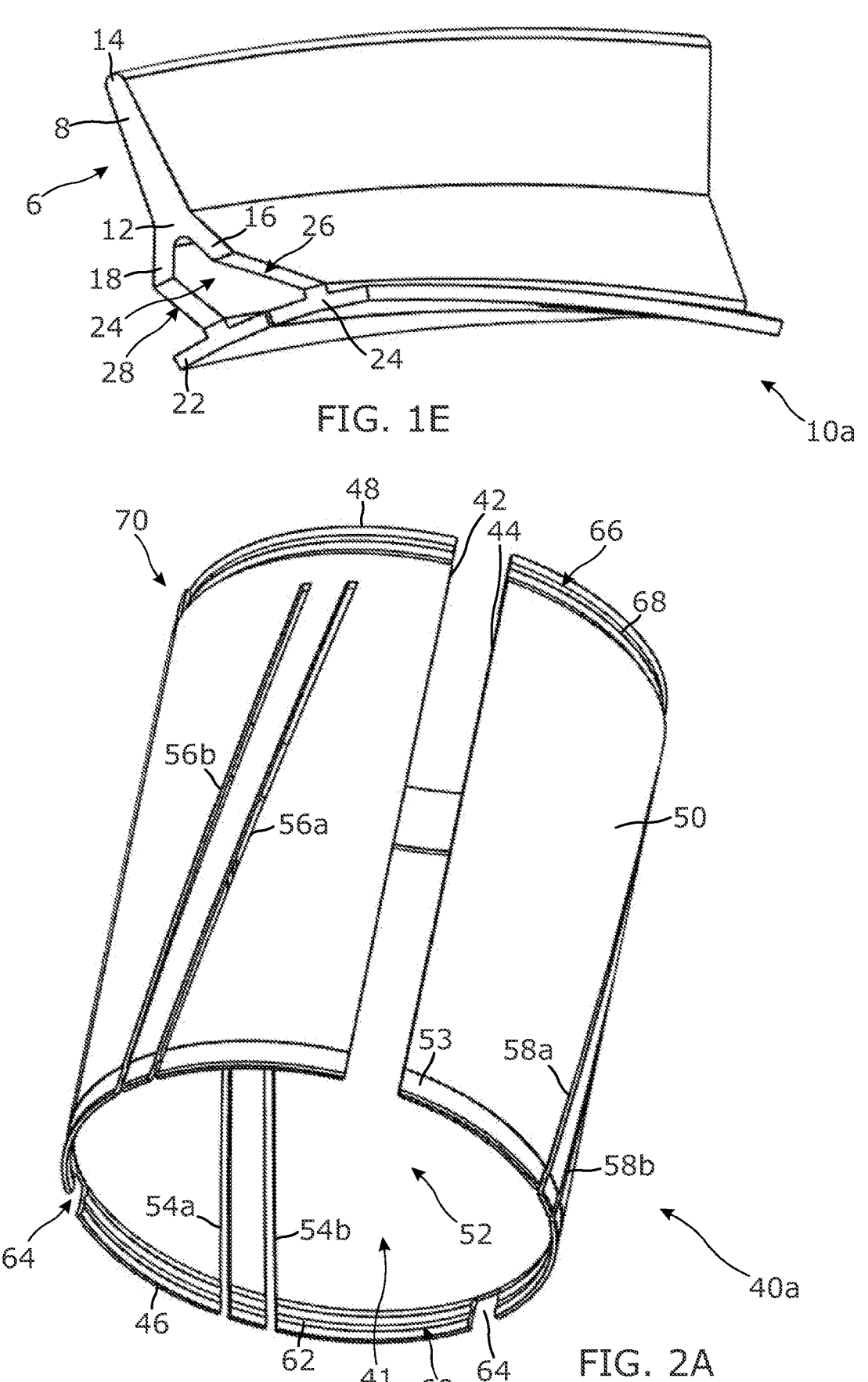
FIG. 1E illustrates a rear perspective view of the first example of the VIV strake fin.
FIGS. 2A to 2C illustrates perspective views of a first example of the VIV strake shell.
Figure 2B:
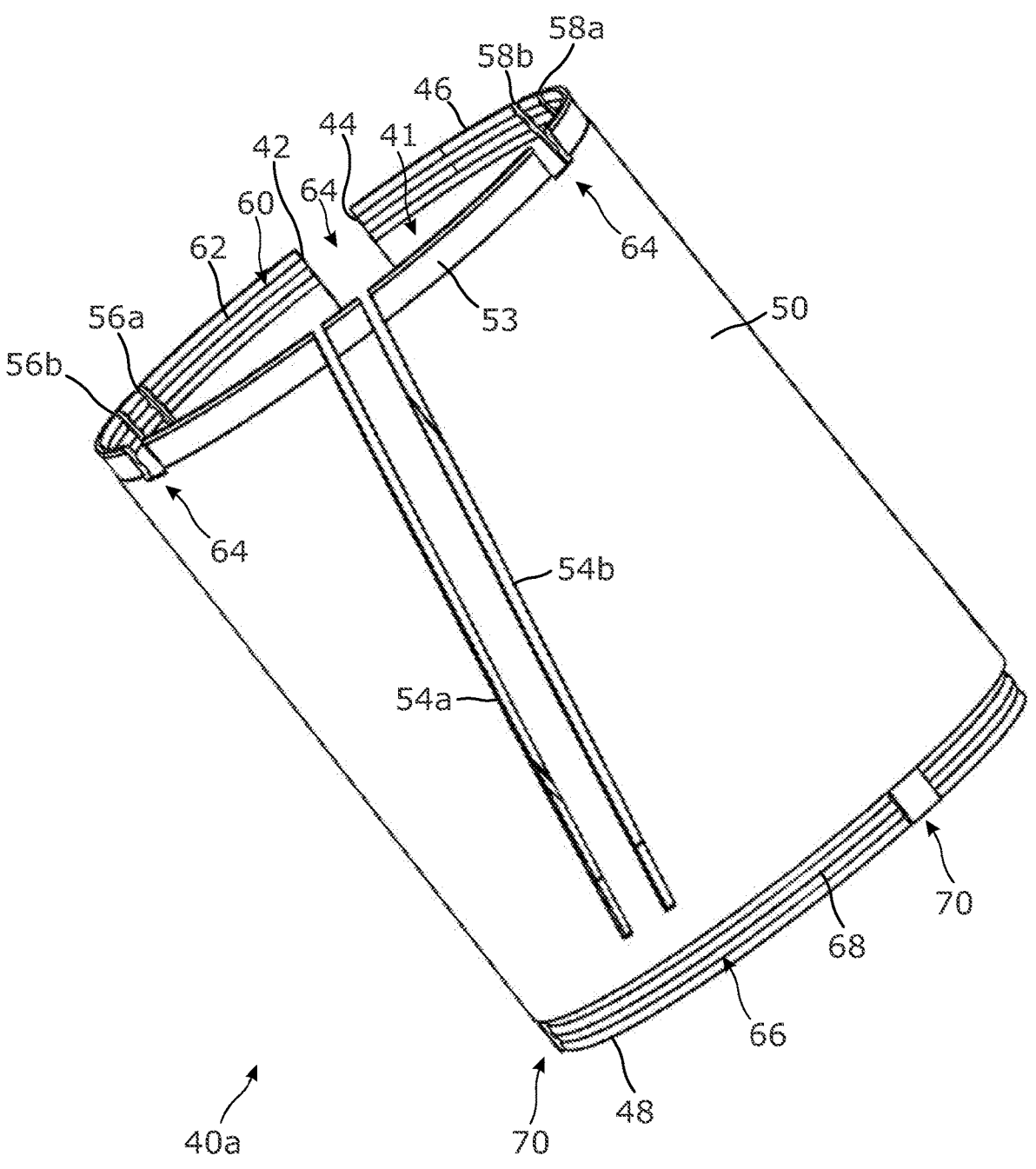
Figure 2C:
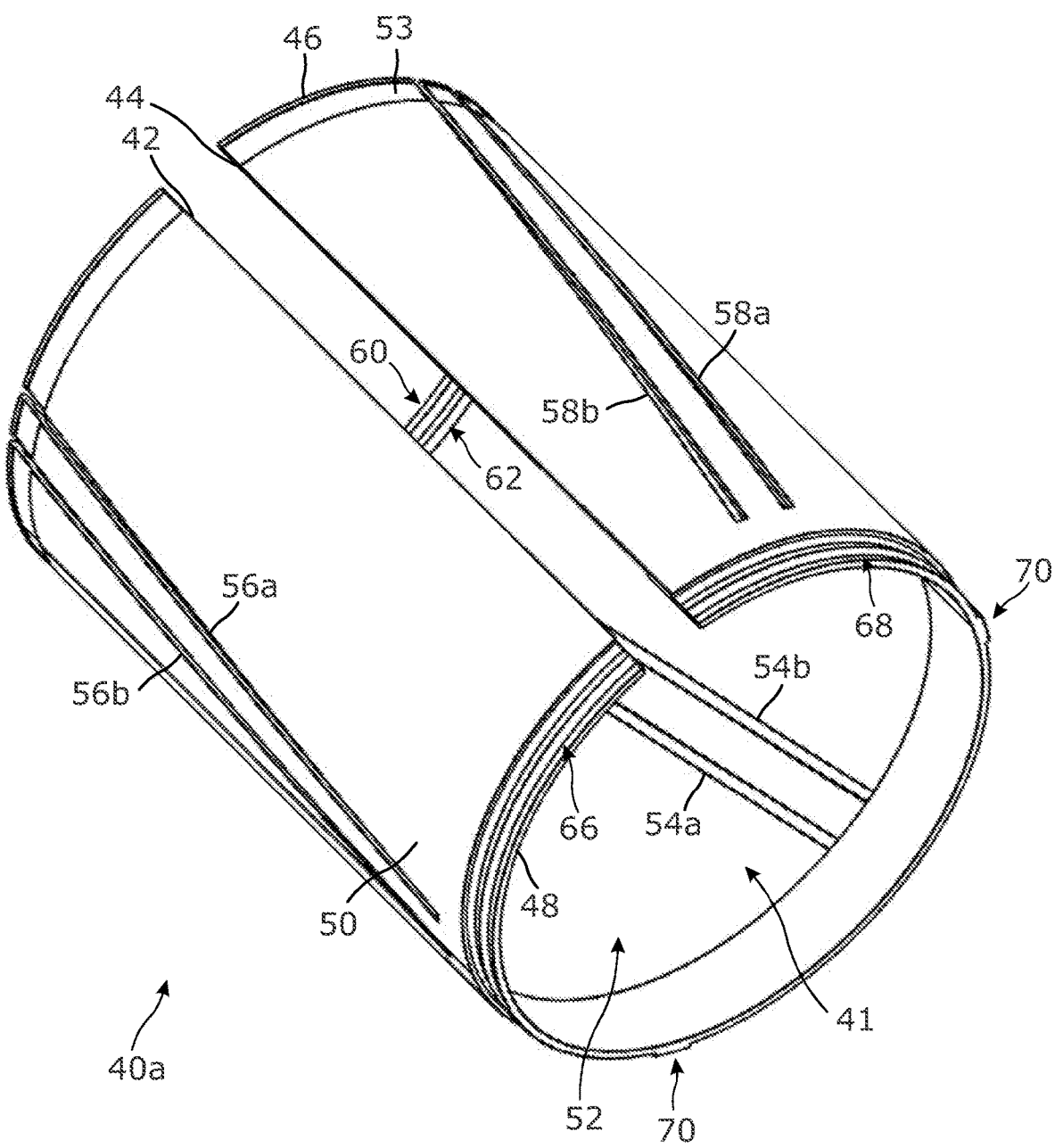

FIGS. 2A to 2C illustrates perspective views of a first example of a VIV strake shell 40a. The VIV strake shell 40a may be formed from a plastics material, such as polyurethane (PU) or polyethylene (PE). The VIV strake shell 40a may be formed from a different material from the VIV Strake fin 10a. The material from which the VIV strake shell 40a is formed may be more rigid than the material from which the VIV strake fin 10a is formed. For example, the Young's modulus of the material from which the VIV strake shell 40a is formed may be 150 MPa to 3 GPa.

The illustrated VIV strake shell 40a has a substantially cylindrical shape, which enables it to extend around a curved conduit. In practice, the VIV strake shell 40a may be supplied in a planar format and curved into a substantially cylindrical shape onboard a ship when fitting the VIV strake shell 40a to a conduit. The radius of curvature of the cylindrical shape may depend on the diameter of the conduit to which the shell 40a is being fitted.

Figure 3A:
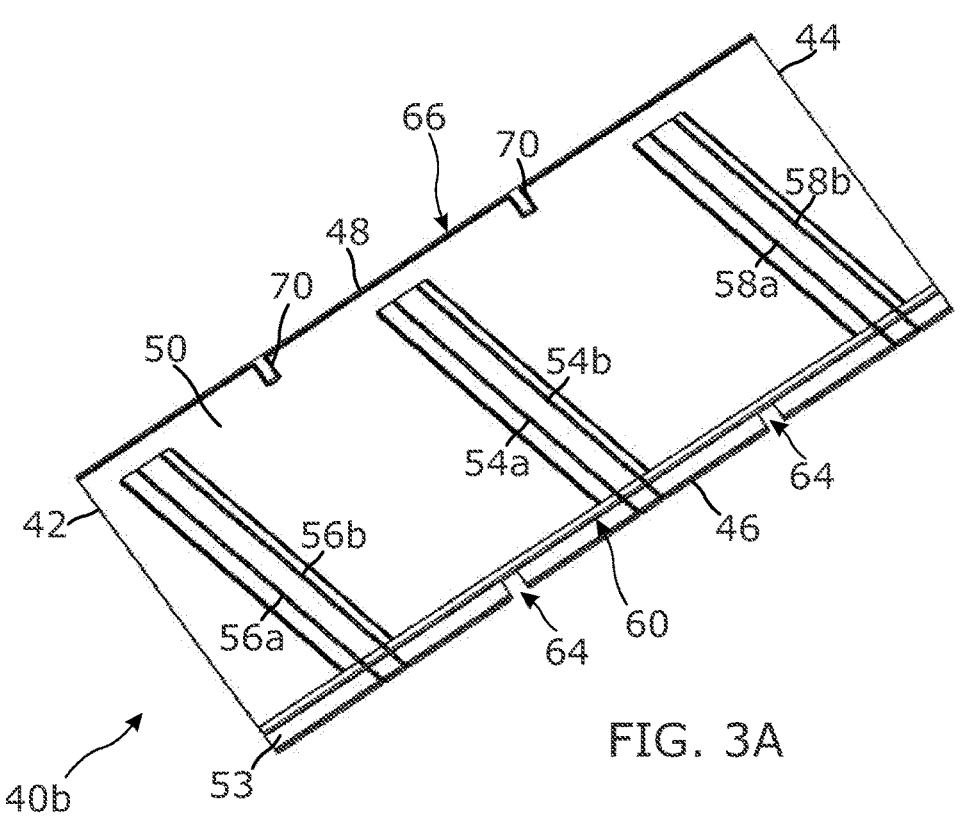
FIG. 3A illustrates a perspective view of a second example of the VIV strake shell.

If the VIV strake shell 40a is supplied in planar format (e.g., as shown in FIG. 3A), it might have first, second, third and fourth (peripheral) edges 42, 44, 46, 48, where the first edge 42 is opposite the second edge 44, and the third edge is opposite 46 the second edge 48. When the shell 40a is curved onsite, it is bent such that the first edge 42 becomes proximal to the second edge 44. The first and second edges 42, 44 might or might not be joined together onsite. The first and second edges 42, 44 remain straight, while the third and fourth edges 46, 48 become curved.

The illustrated (curved) VIV strake shell 40a has an outer surface 50 and an inner surface 52. The shell 40a defines a void 41 in which a conduit may be located. The void 41 may be substantially cylindrical in shape. In use, a longitudinal/ cylindrical axis of the conduit extends through the void 41 and may be aligned with the longitudinal/cylindrical axis of the shell 40a. In some examples, the inner surface 52 may be positioned adjacent to (and possibly in contact with) the curved outer surface of the conduit when fitting the VIV strake shell 40a to the conduit. In other examples, a material may be located between the outer surface of the conduit and the inner surface 52 of the shell 40a.

Each of the curved peripheral edges 46, 48 define end faces of the shell 40a. Each of the edges 46, 48 (at least partially) defines an entrance to the void 41 in which a conduit may be located.

Each of the curved peripheral edges 46, 48 at the ends of the shell 40a may be for connection to another shell 40a. That other shell 40a may have the form as the shell 40a illustrated in FIGS. 2A to 2C. As shown in the figures, each of the curved peripheral edges 46, 48 includes at least one connector/connection means 60, 66 for connecting the shell 40a to another adjacent shell 40a.

At one of the curved peripheral edges 46, a first connector 60 includes a plurality of ridges 62 on the inner surface 52 of the shell 40a at the edge 46, and one or more recesses 64. The ridges 62 are raised portions of the inner surface 52. They may project radially inwards. In the illustrated example, each of the recesses 64 extend inwards in the same direction as the cylindrical/longitudinal axis of the shell 40a. Each of the recesses 64 may be a cut-out at the edge 46.

At the other curved peripheral edge 48, a second connector 66 includes a plurality of ridges 68 on the outer surface 50 of the shell 40a at the edge 48 and one or more projections 70. The ridges 68 are raised portions of the outer surface 50. They may project radially outwards. In the illustrated example, the one or more projections 70 project radially outwards beyond the ridges 68.

The first connector 60 is for connection to a connector of the same form as the second connector 66 on a different, adjacent shell 40a. Similarly, the second connector 66 is for connection to a connector of the same form as the first connector 60 on another, different, adjacent shell 40a. The two sets of ridges 62, 68 are configured to intermesh to prevent or restrict longitudinal movement of the shells 40a relative to each other (i.e., movement in the direction of the longitudinal/cylindrical axis of the shells 40a). Each of the projections 70 is for location in a recess 64 in order to enable adjacent shells 40a to be located together, and once they are located together, it may prevent or restrict rotational movement of the shells 40a about their longitudinal/cylindrical axis.

It will be appreciated by those skilled in the art that the connectors 60, 66 are generally configured to connect adjacent shells 40a and to prevent/restrict longitudinal and rotational movement of those shells 40a relative to each other. In this regard, the connectors 60, 66 might have a different form. For example, one of the connectors 60, 66 might only have a single ridge 62, 68.

The shell 40a includes a plurality of sets of apertures 54a-b, 56a-b, 58a-b. In the illustrated example there are first 54a-b, second 56a-b and third 58a-b sets of apertures, and there are two apertures in each set. A tongue portion of the shell 40a is located between the adjacent apertures 54a-b, 56a-b, 58a-b in a set. There may be more or fewer sets of apertures 54a-b, 56a-b, 58a-b in other examples, and more than two apertures in each set. In the illustrated example, each aperture 54a-b, 56a-b, 58a-b is in the form of an elongate slot. The orientation of a particular elongate slot 54a, 56a, 58a is aligned with the orientation of each other elongate slot 54*b*, 56*b*, 58*b* in the set, such that the slots 54*a-b*, 56*a-b*, 58*a-b* in the set are parallel to each other.

Each of the apertures/slots 54*a-b*, 56*a-b*, 58*a-b* is open at an end face defined by a curved edge 46 of the shell 40*a*. This means that the tongue portions have a free end at the edge 46. In this example, the apertures 54*a-b*, 56*a-b*, 58*a-b* do not extend all the way to the other curved end/edge 48 of the shell 40*a*.

The curved outer surface 50 of the shell 40*a* comprises a (circumferential) recess 53. The outer surface 50 of the shell 40*a* may be recessed radially inwardly in this regard. In this example, the recess 53 extends around the entire circumference of the shell 40*a*.

Each set of apertures 54*a-b*, 56*a-b*, 58*a-b* is configured to receive a VIV strake fin 10*a*, such as that illustrated in FIGS. 1A to 1D and described above. Each set of apertures 54*a-b*, 56*a-b*, 58*a-b* may be considered to form a track or guide for a VIV strake fin 10*a*.

A VIV strake fin 10*a* may be received by a set of apertures 54*a-b*, 56*a-b*, 58*a-b* by locating the each of the legs 16, 18 of the fin 10*a* into each one of a set of apertures 54*a-b*, 56*a-b*, 58*a-b* at their open ends located at the curved edge 46. In this regard, each of the apertures 54*a-b*, 56*a-b*, 58*a-b* in a set of apertures 54*a-b*, 56*a-b*, 58*a-b* is for receiving at least part of a leg 16, 18 of a fin 10*a*. When the fin 10*a* is inserted into the set of apertures 54*a-b*, 56*a-b*, 58*a-b*, the shell 40*a* is located between the anchors 20, 22 and the fin tip 8.

Each set of apertures 54*a-b*, 56*a-b*, 58*a-b* is arranged to form a portion of a helical shape, such that when a set of shells 40*a* are positioned/connected together along a conduit, the apertures 54*a-b*, 56*a-b*, 58*a-b* define a plurality of helices extending around the outside of the shells 40*a*.

FIG. 3A illustrates a perspective view of a second example of the VIV strake shell 40*b*. FIG. 3A illustrates an example of a VIV strake shell 40*b* that has been manufactured in a planar shape, as explained above in relation to the VIV strake shell 40*a* illustrated in FIGS. 2A to 2C. The VIV strake shell 40*b* may be curved into a substantially cylindrical shape onboard a ship when fitting the VIV strake shell 40*b* to a conduit. The radius of curvature of the cylindrical shape may depend on the radius of curvature of the conduit to which the shell 40*b* is being fitted. When the VIV strake shell 40*b* is curved into a substantially cylindrical shape, it will have a similar shape to the VIV strake shell 40*a* illustrated in FIGS. 2A to 2C.

Figure 3B:
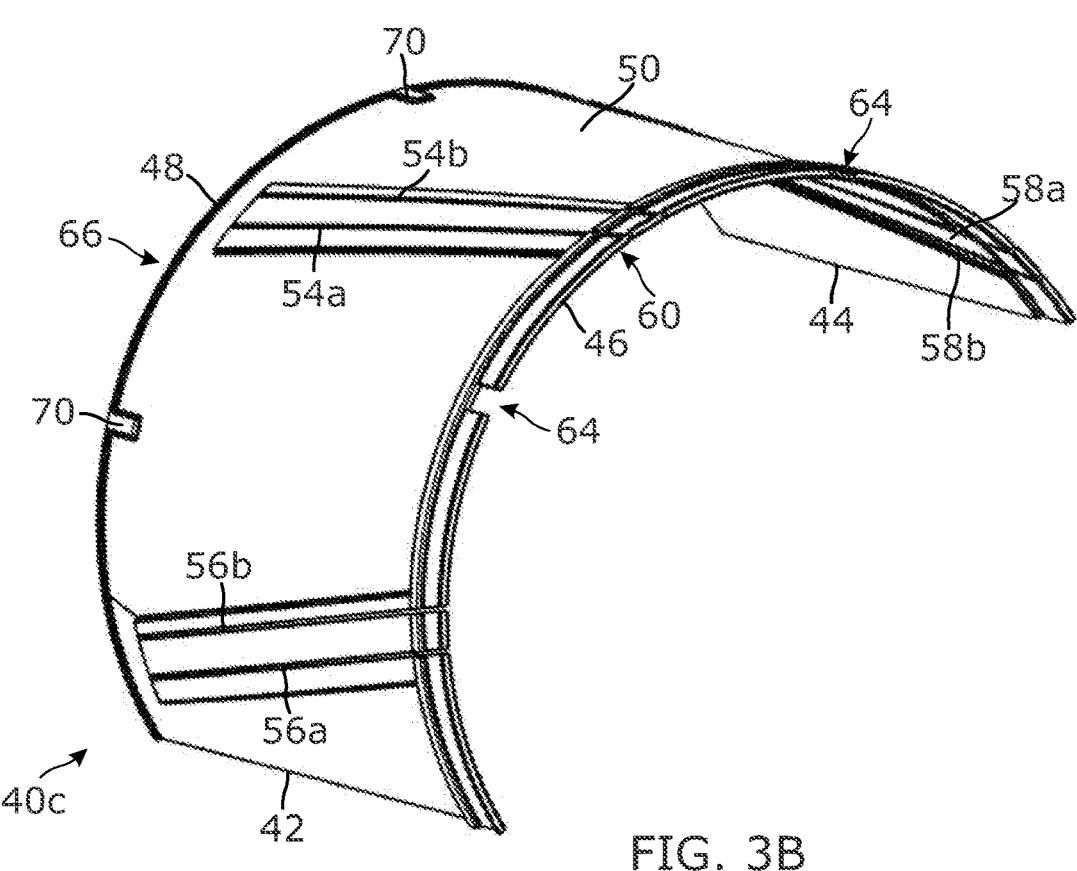
FIG. 3B illustrates a perspective view of a third example of the VIV strake shell.

FIG. 3B illustrates a perspective view of a third example of the VIV strake shell 40*c* that has been manufactured in a (single) curved shape. The VIV strake shell 40*c* may be further curved when fitting it to a conduit.

Figure 3C:
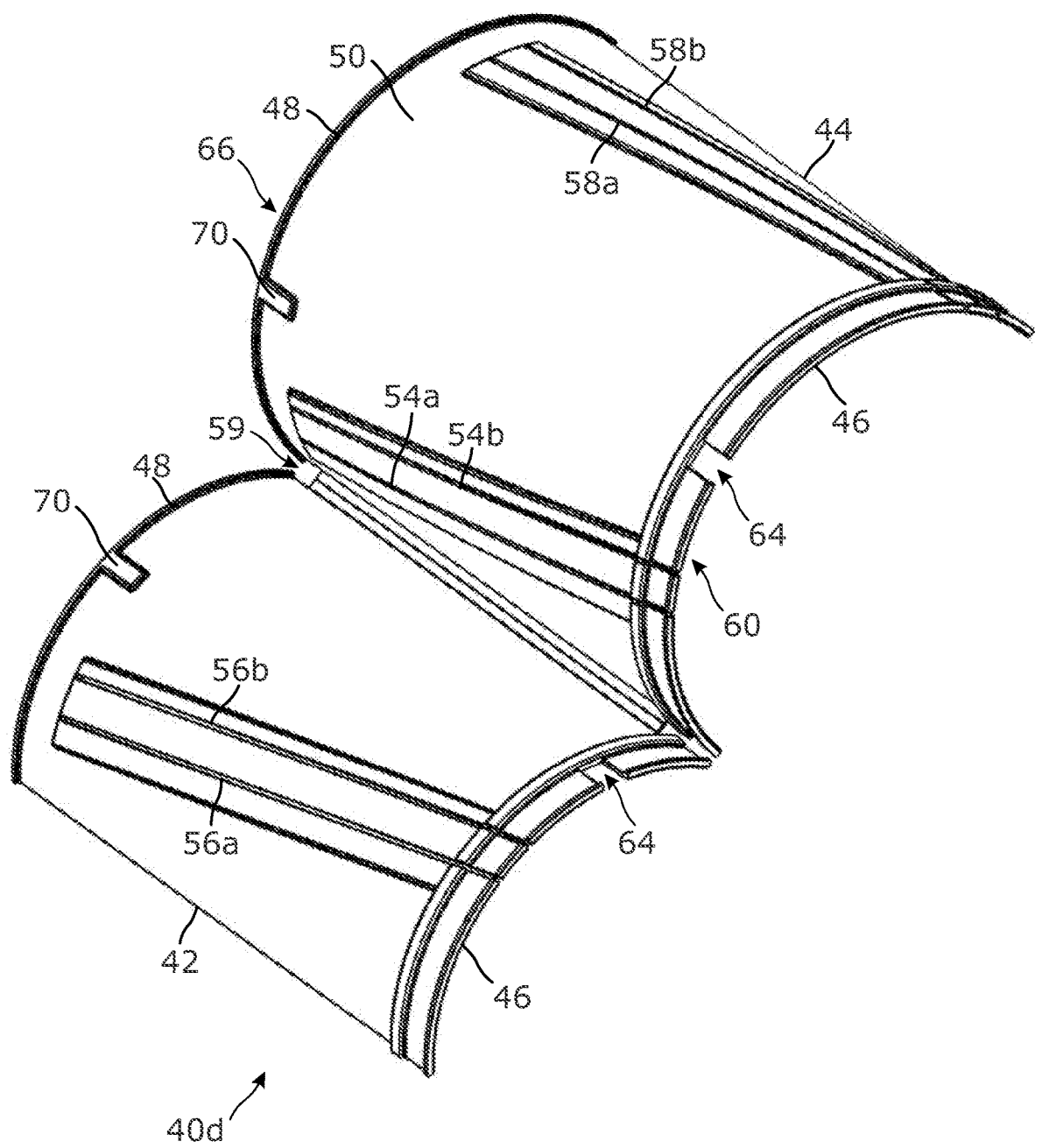
FIG. 3C illustrates a perspective view of a fourth example of the VIV strake shell.

FIG. 3C illustrates a perspective view of a fourth example of the VIV strake shell 40*d* that has been manufactured in a curved shape. In this example, the VIV strake shell 40*d* comprises two curved portions that are connected by a hinge 59.

Figure 3D:
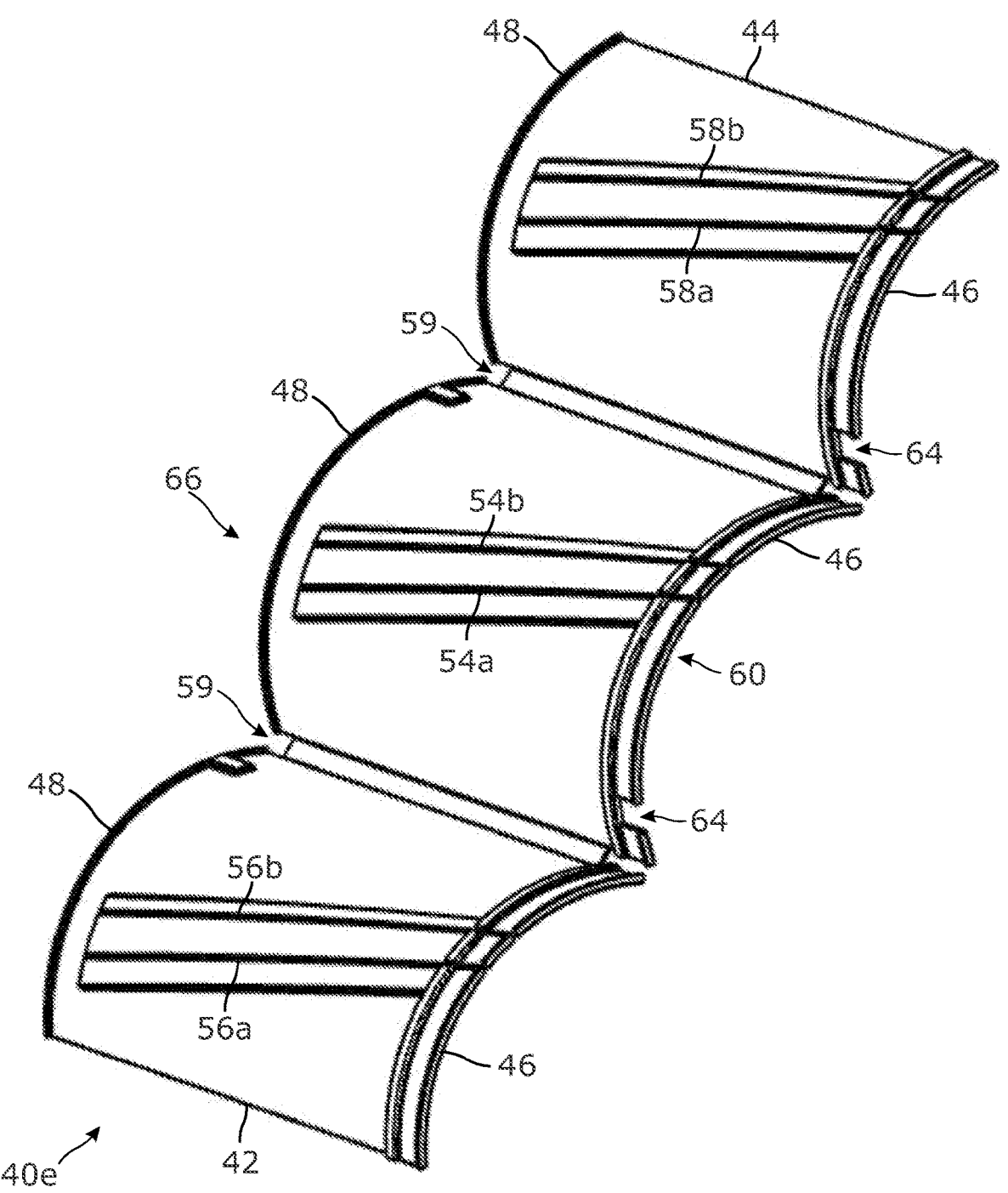
FIG. 3D illustrates a perspective view of a fifth example of the VIV strake shell.

FIG. 3D illustrates a perspective view of a fifth example of the VIV strake shell 40*e* that has been manufactured in a curved shape. In this example, the VIV strake shell 40*e* comprises three curved portions, where adjacent curved portions are connected by a hinge 59.

Figure 4:
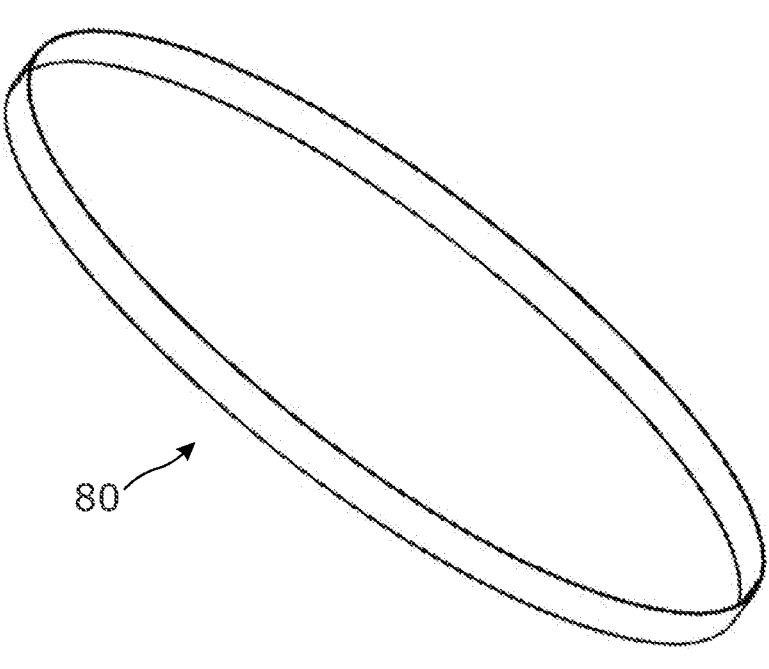
FIG. 4 illustrates a retainer.

FIG. 4 illustrates a retainer 80. The retainer 80 may, for example, be a strap. The retainer 80 may be formed from one or more metals, such as steel. The retainer 80 is for securing a VIV strake shell 40*a-e* to a conduit. The retainer 80 may, for example, bind the shell 40-*e* to the conduit. This is described in further detail below.

Figure 5:
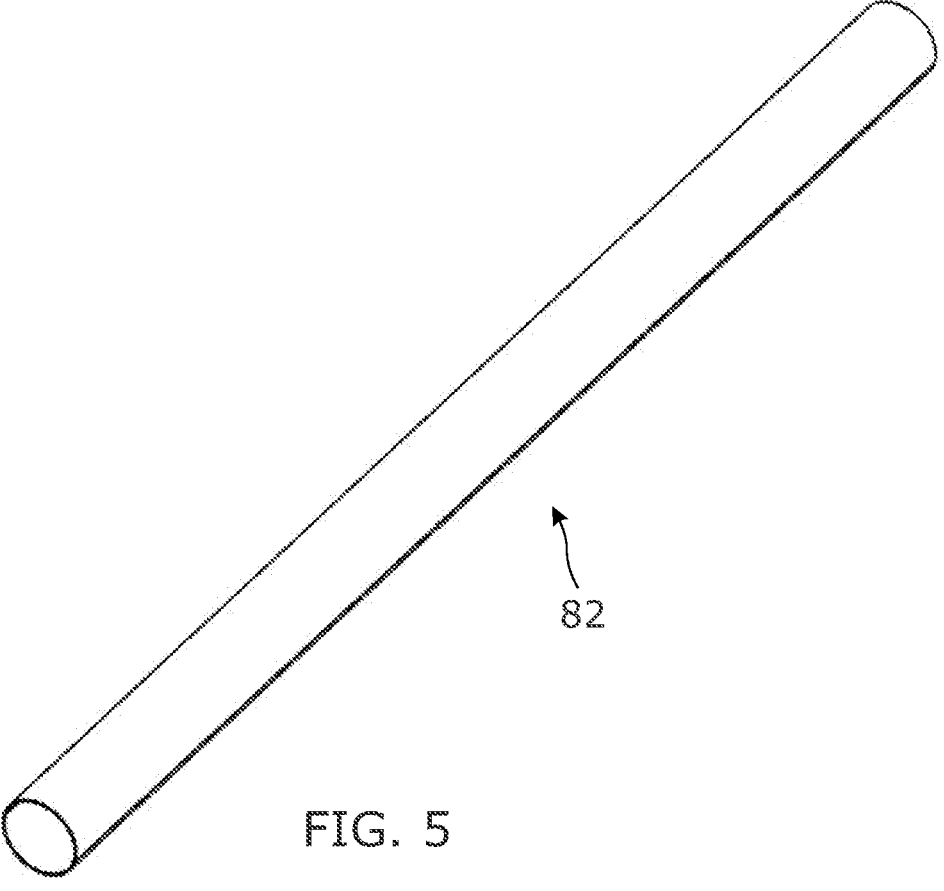
FIG. 5 illustrates a conduit.

FIG. 5 illustrates a conduit 82. The conduit 82 is substantially cylindrical in shape.

Figure 6:
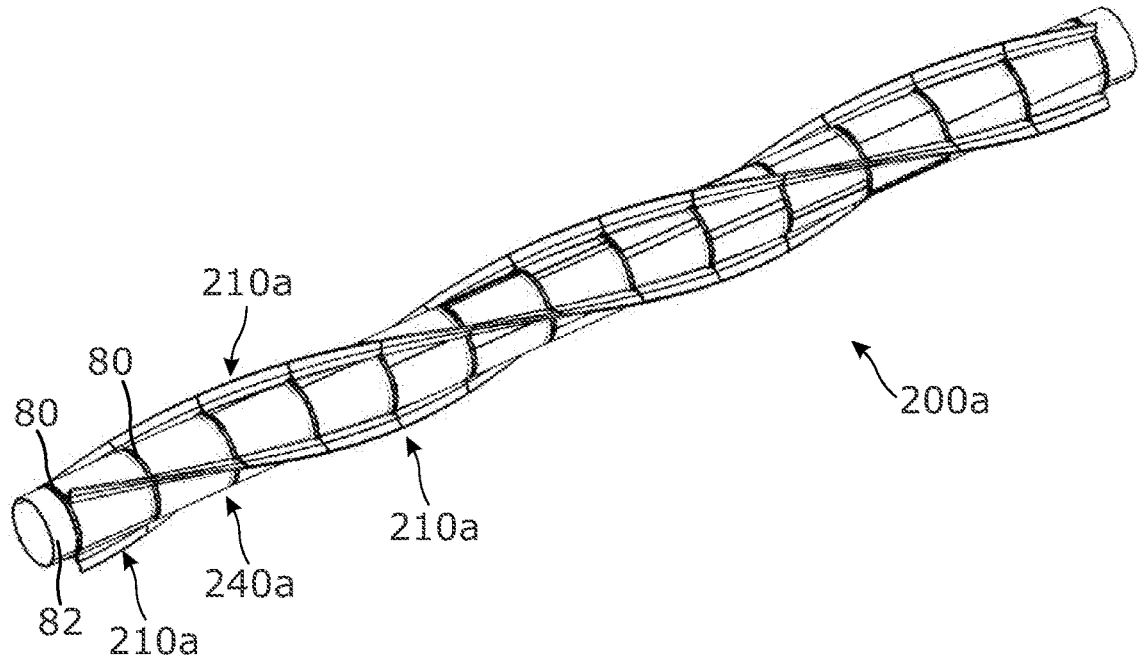
FIG. 6 illustrates a first example of a VIV strake arrangement that comprises the first example of the VIV strake shell and the first example of the VIV strake fin.

FIG. 6 illustrates a first example of a VIV strake arrangement 200*a* that comprises a plurality of VIV strake shells 240 and a plurality of VIV strake fins 210*a*. In this example, the VIV strake shells 40*a* are those illustrated in FIGS. 2A to 2C, but in other examples they may be the VIV strake shells illustrated in any of FIGS. 3A to 3D.

The VIV strake fins 210*a* are the same as that illustrated in FIGS. 1A to 1E. Each set of VIV strake fins 210*a* extends helically around the VIV strake shells 240*a*. In this example there are three sets of VIV strake fins 210*a*, but in other examples there might be more or fewer sets.

Figure 7A:
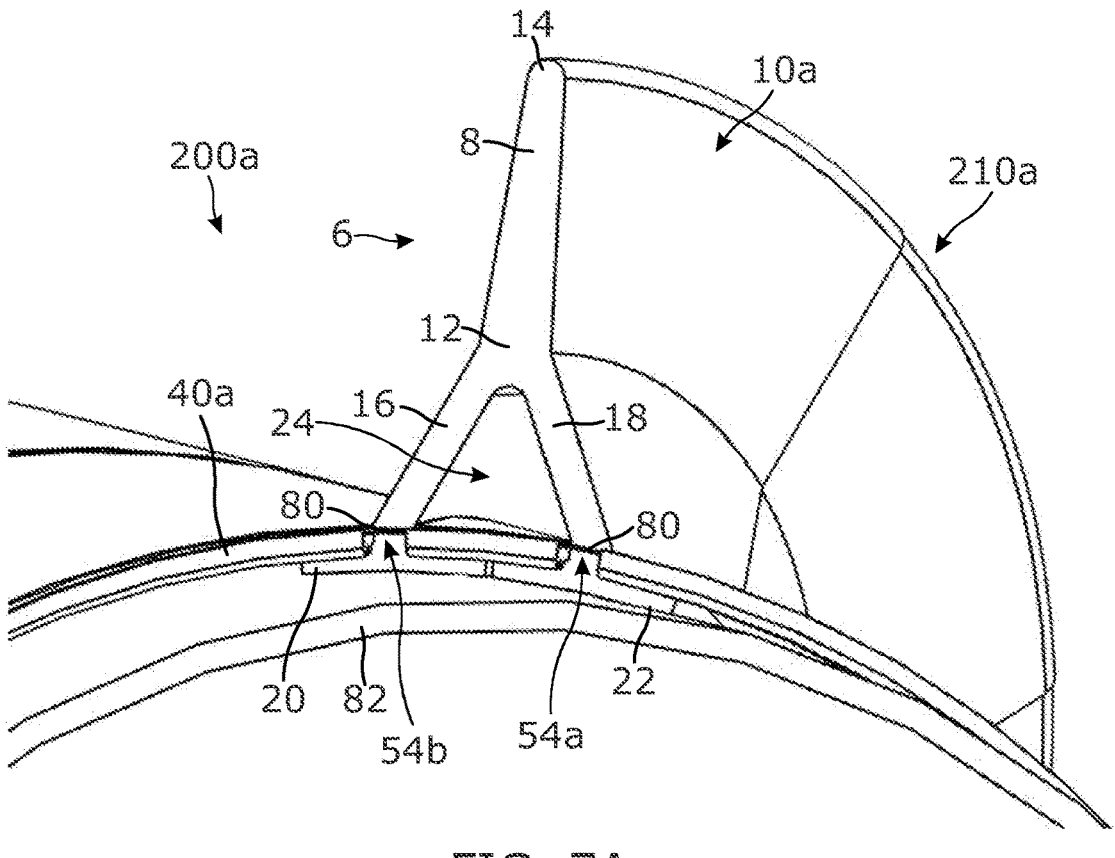
FIG. 7A to 7C illustrate magnified views of portions of the first example of the VIV strake arrangement.
Figure 7B:
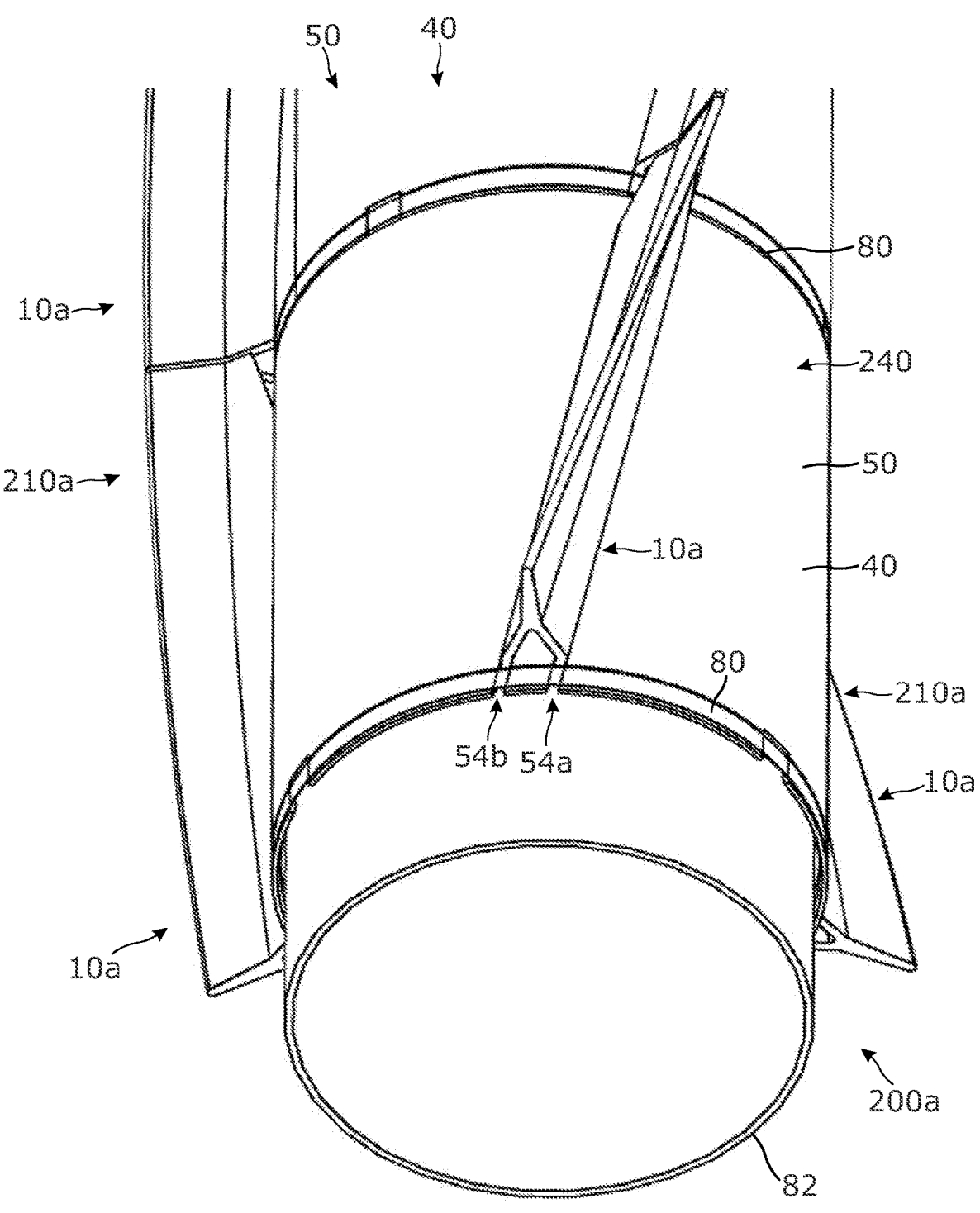
Figure 7C:
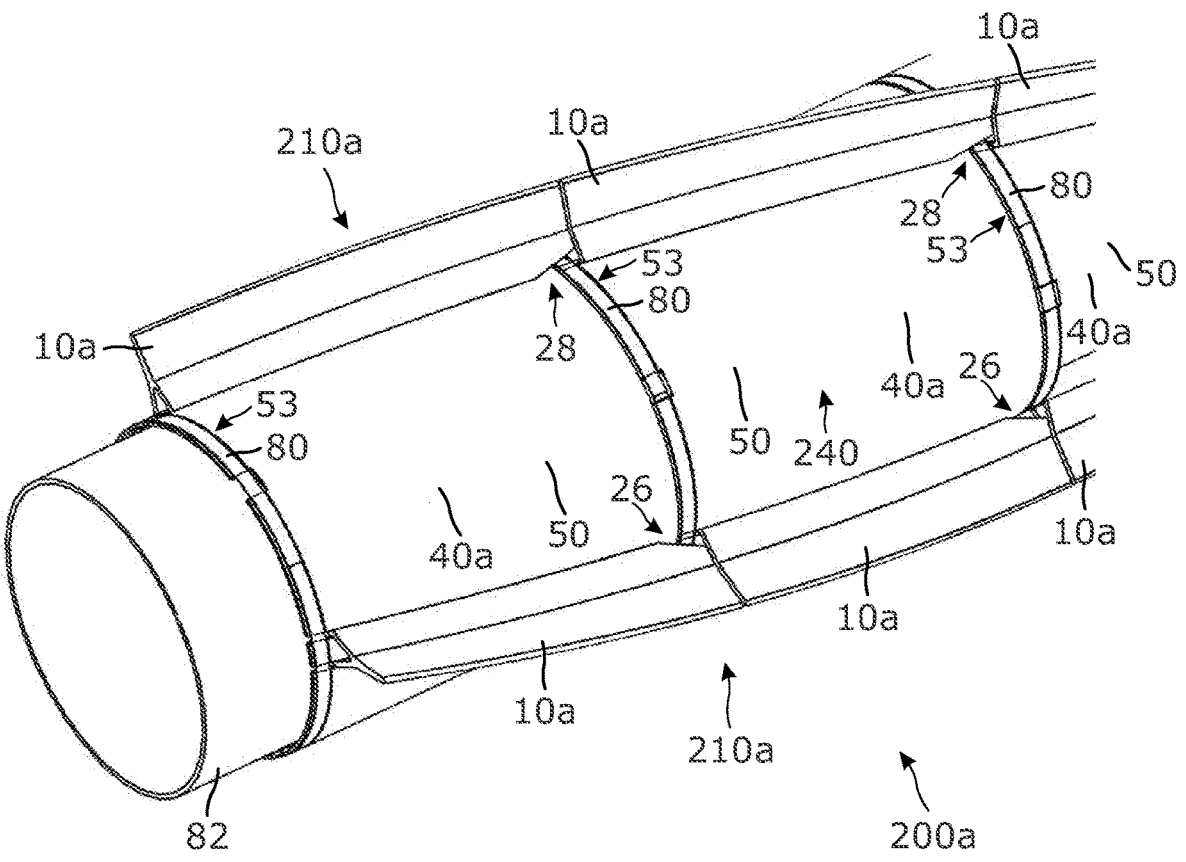

FIG. 7A to 7C illustrate magnified views of portions of the first example of the VIV strake arrangement 200*a* fitted to the conduit 82. It can be seen clearly in FIGS. 7A to 7C how the connection between each of the VIV strake fins 10*a* and each shell 40*a* is formed. As explained above, a VIV strake fin 10*a* is received by a set of apertures 54*a-b*, 56*a-b*, 58*a-b* in a shell 40*a* by locating the each of the legs 16, 18 of the fin 10*a* into each one of a set of apertures 54*a-b*, 56*a-b*, 58*a-b* at their open ends located at the curved edge 46. When the fin 10*a* is inserted into the set of apertures 54*a-b*, 56*a-b*, 58*a-b*, the shell 40*a* is located between the anchors 20, 22 and the fin tip 8. This is best seen in FIG. 7A. It can also be seen in FIG. 7A that the anchors 20, 22 are located between the conduit 82 and the shell 40*a*.

Once a fin 10*a* has been inserted into a set of apertures 54*a-b*, 56*a-b*, 58*a-b*, it is held in place using a retainer 80. In this regard, a retainer 80 is located in the recess 53 on the outer surface of the shell 40*a*. The retainer 80 binds the shell 40*a* to the conduit and also, due to its positioning at the open end of the apertures 54*a-b*, 56*a-b*, 58*a-b*, prevents the fin 10*a* from being removed from the apertures 54*a-b*, 56*a-b*, 58*a-b* after it has been inserted into the apertures 54*a-b*, 56*a-b*, 58*a-b*. Furthermore, location of each of the retainers 80 in a recess 53 mitigates or prevents the retainers 80 from moving out of position.

It will be understood from viewing FIG. 7A how the anchors 20, 22 are arranged to resist extraction of the fin 10*a* from the shell 40*a* (for example, if the fin 10*a* were subject to an outward radial force).

It can be seen in FIG. 7C how the recesses 26, 28 in each of the legs 16, 18 of a fin 10*a* are shaped to accommodate a retainer 80. The recesses 26, 28 enable a retainer 80 to pass underneath the fin 10*a*, while maximizing the length of the fin tip 8 for improved performance. The retainer 80 that passes underneath the fin 10*a* is located in a recess 53 of a different, adjacent shell 40*a* from the shell 40*a* in which that fin 10*a* is located.

Each of FIGS. 7A to 7C illustrate that at least a portion of the void 24 in each of the fins 10*a* is located outside the VIV strake shell 40*a*. That is, the void 24 is located adjacent the outer surface 50 of the shell 40*a*. In these examples, a majority of the void 24 (and possibly substantially the entire void 24) is located outside the VIV strake shell 40*a*.

As explained above, an advantage of the void 24 within each of the fins 10*a* is that the flexible legs 16, 18 of the fins 10*a* may temporarily flex into the void 24 as a conduit 82 including the arrangement 200*a* is moved along the rollers onboard a ship. Advantageously, this helps to avoid permanent damage being caused to the fins 10*a*, providing a more effective VIV strake arrangement 200*a* in use.

In some examples, the inner surface 52 of each shell 40*a* is adjacent to (and possibly in contact with) the curved outer surface of the conduit 82. In other examples, a material may be located between the outer surface of the conduit 82 and the inner surface 52 of the shell 40*a*. For instance, one or more pads may be located between the inner surface 52 of the shell 40*a* and the outer surface of the conduit. The one or more pads might, for example, be made from a rubber material. The one or more pads might serve to provide increased friction (relative to the shells 40*a* being fitted directly to the conduit 82 without the pad(s) therebetween) in order to provide an improved fit. The one or more pads might also provide a layer that can be compressed by the retainers 80, further improving the fit.

Figure 8A:
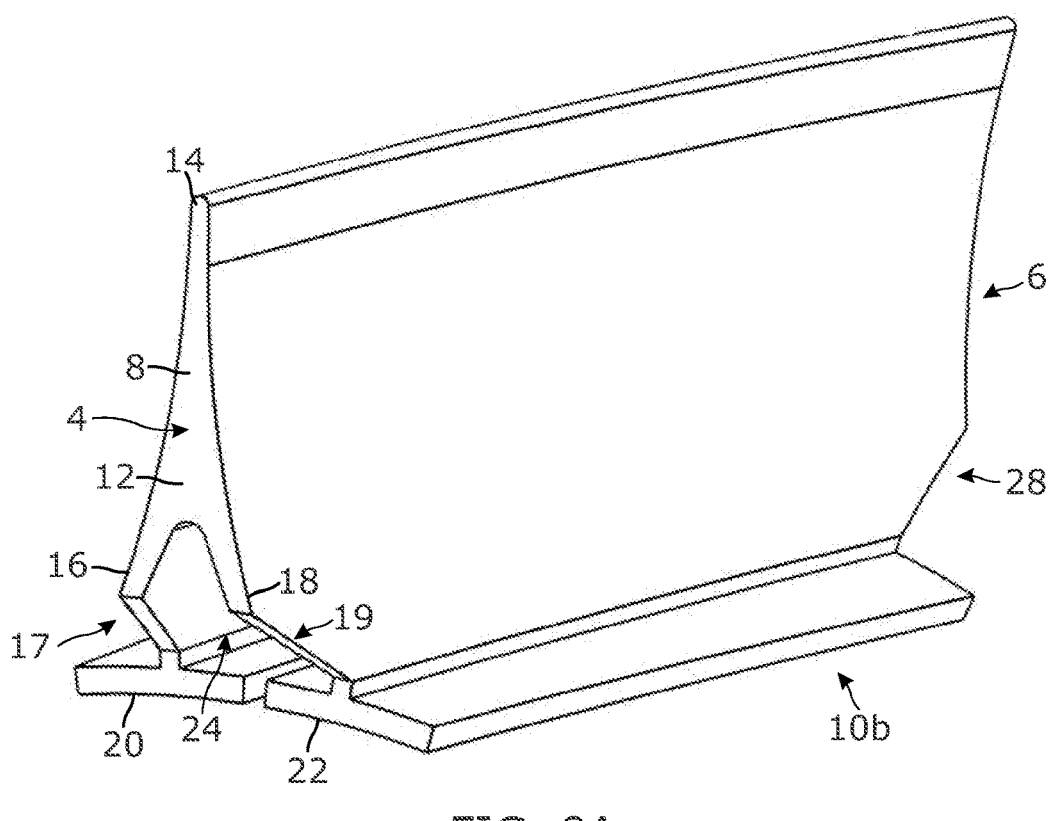
FIG. 8A illustrates a front perspective view of a second example of the VIV strake fin.
Figure 8B:
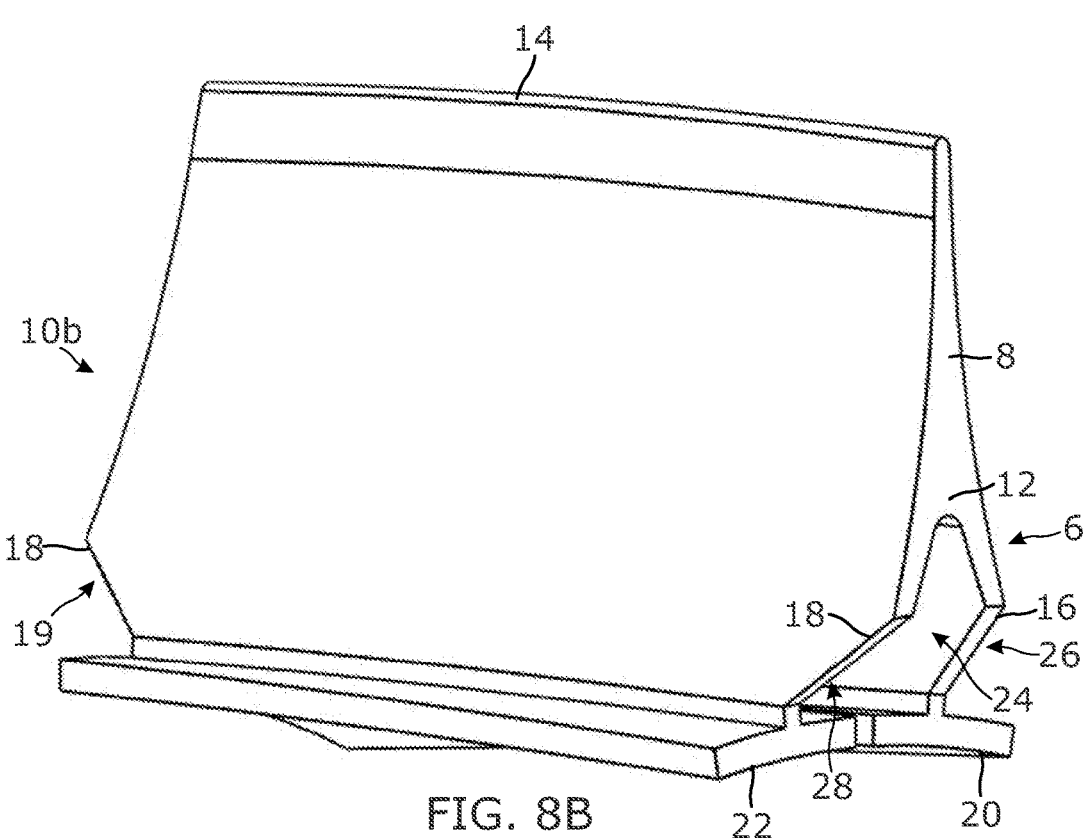
FIG. 8B illustrates a rear perspective view of the second example of the VIV strake fin.

FIG. 8A illustrate front perspective and rear perspective views of a second example 10*b* of the VIV strake fin.

The VIV strake fin 10*b* is the same as the first example 10*a*, other than that there are two sets of recesses 17, 19, 26, 28 in the legs 16, 18 of the fin 10*b*. That is, in addition to the recesses 26, 28 located in legs 16, 18 at the second face 6 of the fin 10*b* there are also recesses 17, 19 located in each of the legs 16, 18 at the first face 6 of the fin 10*b*.

The first set of recesses 17, 19 is shaped to accommodate a first retainer 80 for securing a VIV strake shell 40*a* to a conduit, and the second set of recesses 26, 28 is shaped to accommodate a second retainer 80.

Figure 9:
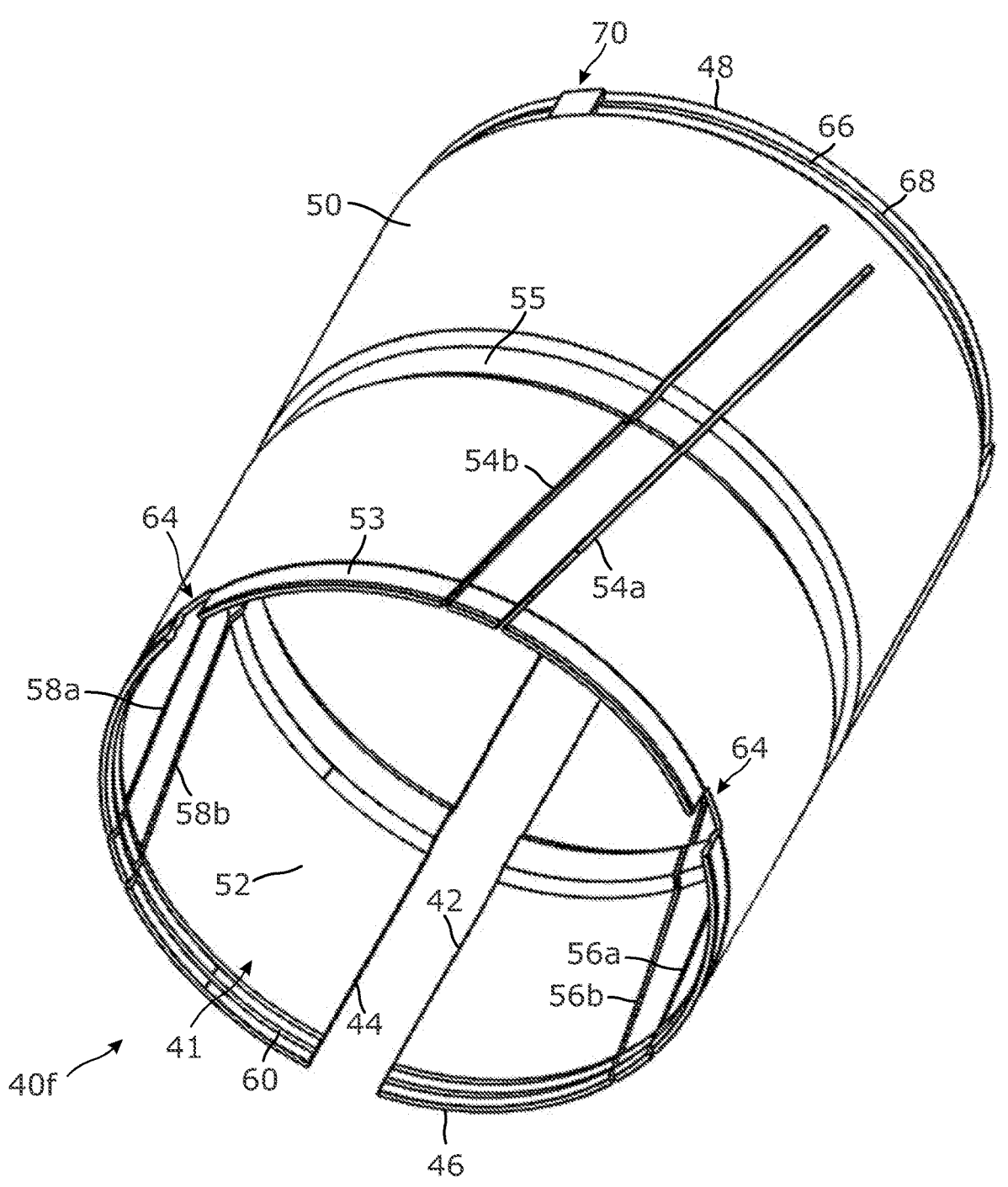
FIG. 9 illustrates a sixth example of the VIV strake shell.

FIG. 9 illustrates a sixth example 40*f* of the VIV strake shell. The sixth example 40*f* of the VIV strake shell is the same as the first example 40*a* illustrated in FIGS. 2A to 2C, other than it comprises an additional recess 55 in the outer surface 50. It may also be longer than the first example 40*a* of the shell. The recesses 53, 55 are longitudinally separated from each other in the dimension defined by the longitudinal/cylindrical axis of the shell 140. The additional recess 55 is positioned between the two curved ends 46, 48 of the shell 40*f*. The apertures 54*a-b*, 56*a-b*, 58*a-b* have an open end at one of the curved ends 46 of the shell 40*b*, and extend through and beyond each of the recesses 53, 55 without reaching the other curved end 48.

Figure 10:
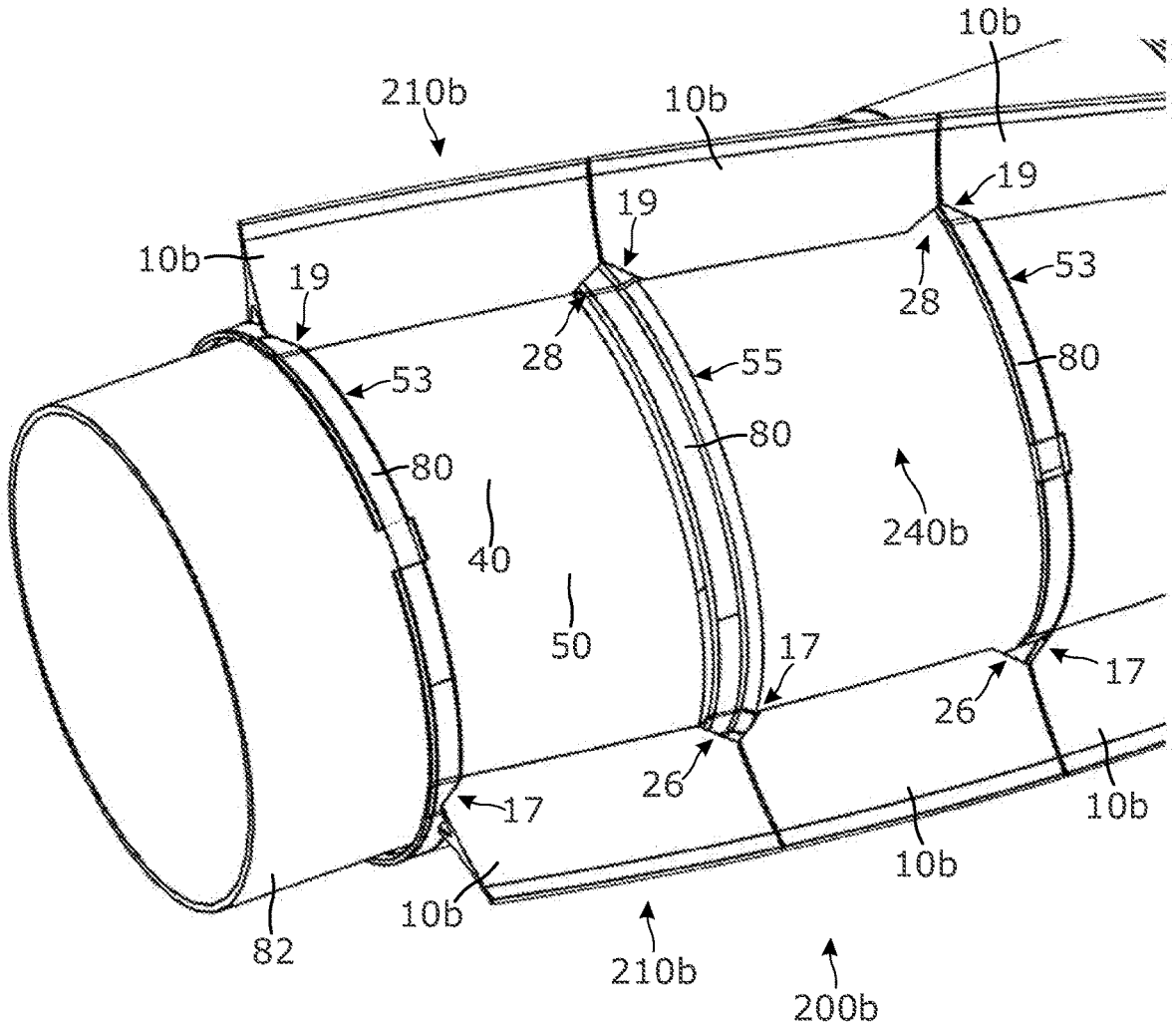
FIG. 10 illustrates a second example of the VIV strake arrangement that comprises the sixth example of the VIV strake shell and the second example of the VIV strake fin.
Figure 11A:
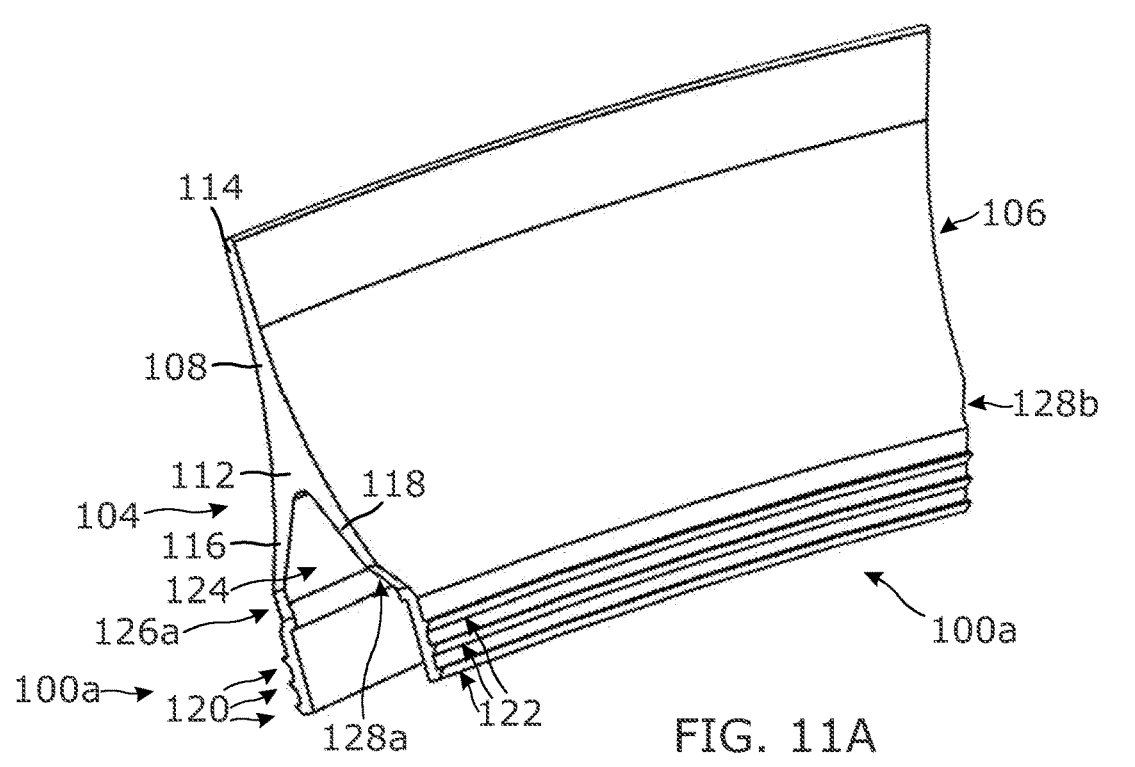
FIG. 11A illustrates a front perspective view of a third example of the VIV strake fin.
Figure 11B:
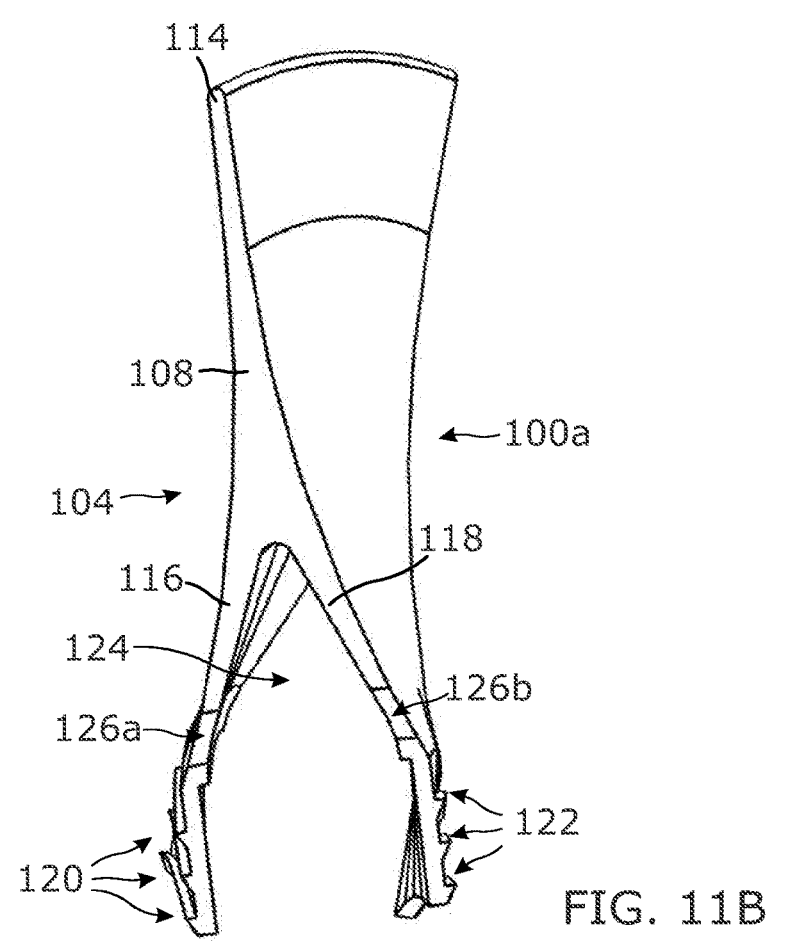
FIG. 11B illustrates a front view of the third example of the VIV strake fin.
Figure 11C:
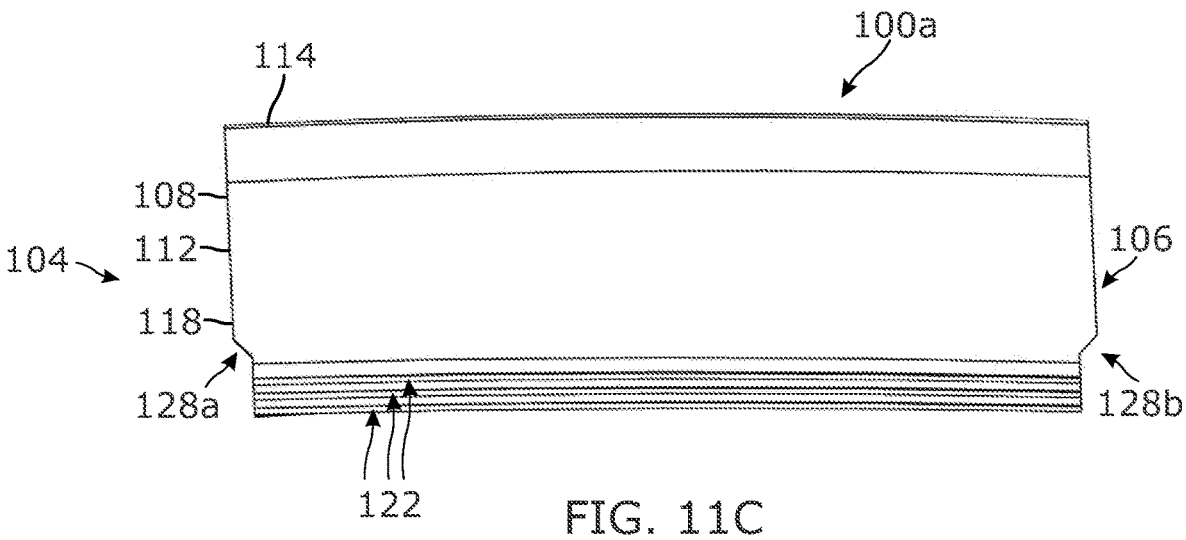
FIG. 11C illustrates a side view of the third example of the VIV strake fin.
Figure 11D:
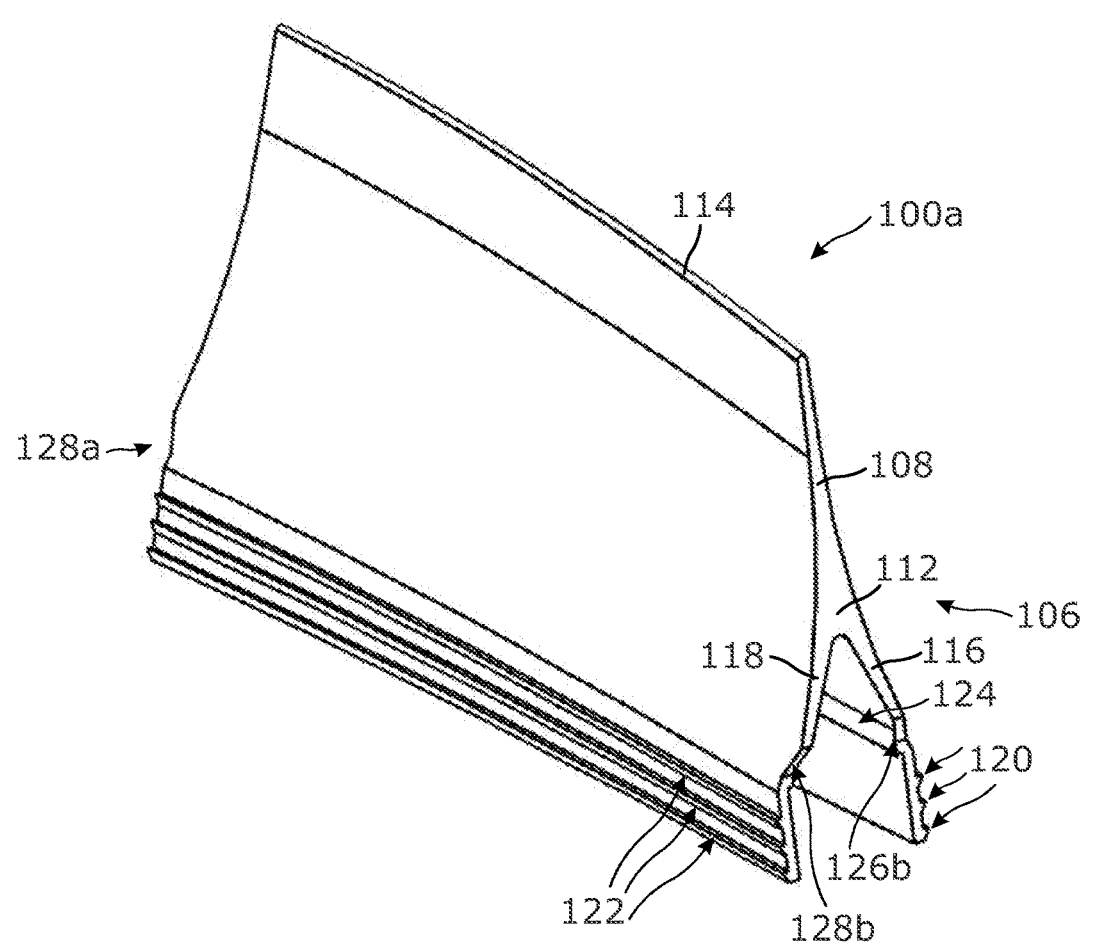
FIG. 11D illustrates a rear perspective view of the third example of the VIV strake fin.

FIG. 10 illustrates a second example 200*b* of the VIV strake arrangement that comprises a plurality 240*b* of the sixth example 40*f* of the VIV strake shell and a plurality 210*b* of the second example 10*b* of the VIV strake fin.

In this example, a plurality of fins 10*b* (e.g., two fins 10*b*) is inserted into a single set of apertures 54*a-b*, 56*a-b*, 58*a-b*, rather than a single fin (as was the case in the VIV strake arrangement 200*a* illustrated in FIGS. 6 to 7C). When assembling the arrangement 200*b*, a first fin 10*b* may be inserted into a set of apertures 54*a-b*, 56*a-b*, 58*a-b* by moving it along the apertures 54*a-b*, 56*a-b*, 58*a-b* until it reaches the end, and then a second fin 10*b* may be inserted into and moved along the same set of apertures 54*a-b*, 56*a-b*, 58*a-b* until it abuts the first fin 10*b*. That is, the second face 6 of the second fin 10*b* may abut the first face 4 of the first fin 10*b*.

It can be seen in FIG. 10 that, at the end of the arrangement 200*b*, the recesses 17, 19 are shaped to accommodate a retainer 80, located in the end recess 53, for securing a shell 40*f* to the conduit 82 and preventing the fin 10*b* from being removed from the apertures 54*a-b*, 56*a-b*, 58*a-b*.

It can also be seen in FIG. 10 that the recesses 17, 19, 26, 28 in adjacent fins 10*b* are shaped to accommodate a further retainer 80, located in the additional recess 55, for securing a shell 40*f* to the conduit 82.

The VIV strake shells 40*a-f* and the VIV strake fins 10*a-b* described above are suitable for and intended for use in a non-buoyant VIV strake arrangement such as those illustrated in FIGS. 6 to 7C. A description of VIV strake fins 100*a-d* and a VIV strake shell 140 that are suitable for and intended for use in a buoyant VIV strake arrangement follow.

FIGS. 11A to 11D illustrate front perspective, front, side and rear perspective views of a third example 100*a* of a VIV strake fin. The illustrated VIV strake fin 100*a* comprises a flexible fin tip 108, a flexible first leg 116 and a flexible second leg 118. The fin tip 108, first leg 116 and the second leg 118 may be integrally formed from the same flexible material. The flexible material may, for example, be a flexible polymer material such as polyurethane (PU) or polyvinyl chloride (PVC), a rubber material such as ethylene propylene dien terpolymer (EFPM rubber or a silicone rubber. The elastic modulus of the flexible material may, for example, be 1 to 15 MPa.

Each of the legs 116, 118 extends from the fin tip 108. The illustrated fin tip 108 has proximal end 112, which is proximal to the legs 116, 118, and a distal end 114, which is distal from the legs 116, 118. Each of the legs 116, 118 extends from the proximal end 112 of the fin tip 108.

The legs 116, 118 define at least one void 124 therebetween. The legs 116, 118 diverge from each other as they extend away from the fin tip 108 to define the void 124. At least a portion of the inner surface of the legs 116, 118 defines the void 124.

As the legs 116, 118 diverge away from each other, the width of the void 124 increases. A portion of the void 124 has a substantially triangular cross-section in the illustrated example, but need not in other examples. In this example the legs 116, 118 diverge substantially linearly as shown in the illustrations. In other examples, however, the legs 116, 118 could be curved. The legs 116, 118 also comprise a non-divergent portion located near their distal ends. In some alternative examples, this portion might instead be divergent.

The illustrated VIV strake fin 100*a* comprises at least first and second anchors 120, 122. At least a first anchor 120 may be located on the first leg 116, and at least a second anchor 122 may be located on the second leg 118. In the illustrated example, a plurality of anchors are located on the first leg 116 and a plurality of anchors are located on the second leg 118. The anchors 120, 122 may be located on an outer surface of each of the first and second legs 116, 118. Each of the anchors 120, 122 might, for example, be a projection such as a pointed projection as shown in FIGS. 11A to 11D.

In the illustrated example, the anchors 120, 122 extend from the first face 104 to the second face 106, but they might not in other examples.

The anchors 120, 122 are configured to hold the VIV strake fin 100*a* in position in a VIV strake shell 140/VIV strake arrangement 300 and resist extraction of the fin 100*a* from the shell 140/arrangement 300.

The VIV strake fin 100*a* has a first face 104 and a second face 106. Each of the first and second faces 104, 106 includes an aperture/entrance to the void 124. In the illustrated example, the void 124 extends through the VIV strake fin 100*a* from the first face 104 to the second face 106.

The VIV strake fin 100*a* has a length dimension which extends from the first face 104 to the second face 106. The length dimension may be the longest extent of the VIV strake fin 100*a*. The VIV strake fin 100*a* has a height dimension which extends from the distal end of the legs 116, 118 to the distal end 114 of the fin tip 108. The height dimension may be orthogonal to the length dimension. The VIV strake fin 100*a* has a width dimension which may be orthogonal to the length dimension and/or the height dimension. The legs 116, 118 diverge in the width dimension.

The length dimension may be greater than the height and width dimensions. The height dimension might or might not be greater than the width dimension.

In some embodiments, the extent of the void 124 may be such that the void 124 has a height dimension that is at least 10% of the height dimension of the VIV strake fin 100*a* as a whole. The void 124 may have a height dimension that is at least 20% or 30% of the height dimension of the fin 100*a*.

As shown in FIGS. 11A to 11D, each of the legs 116, 118 may include a recess 126*a*, 126*b*, 128*a*, 128*b* located at the first face 104 and the second face 106 of the fin 100*a*. The recesses 126*a*, 126*b*, 128*a*, 128*b* are shaped to accommodate a retainer 80 for securing a VIV strake shell 140 to a conduit.

Figure 12A:
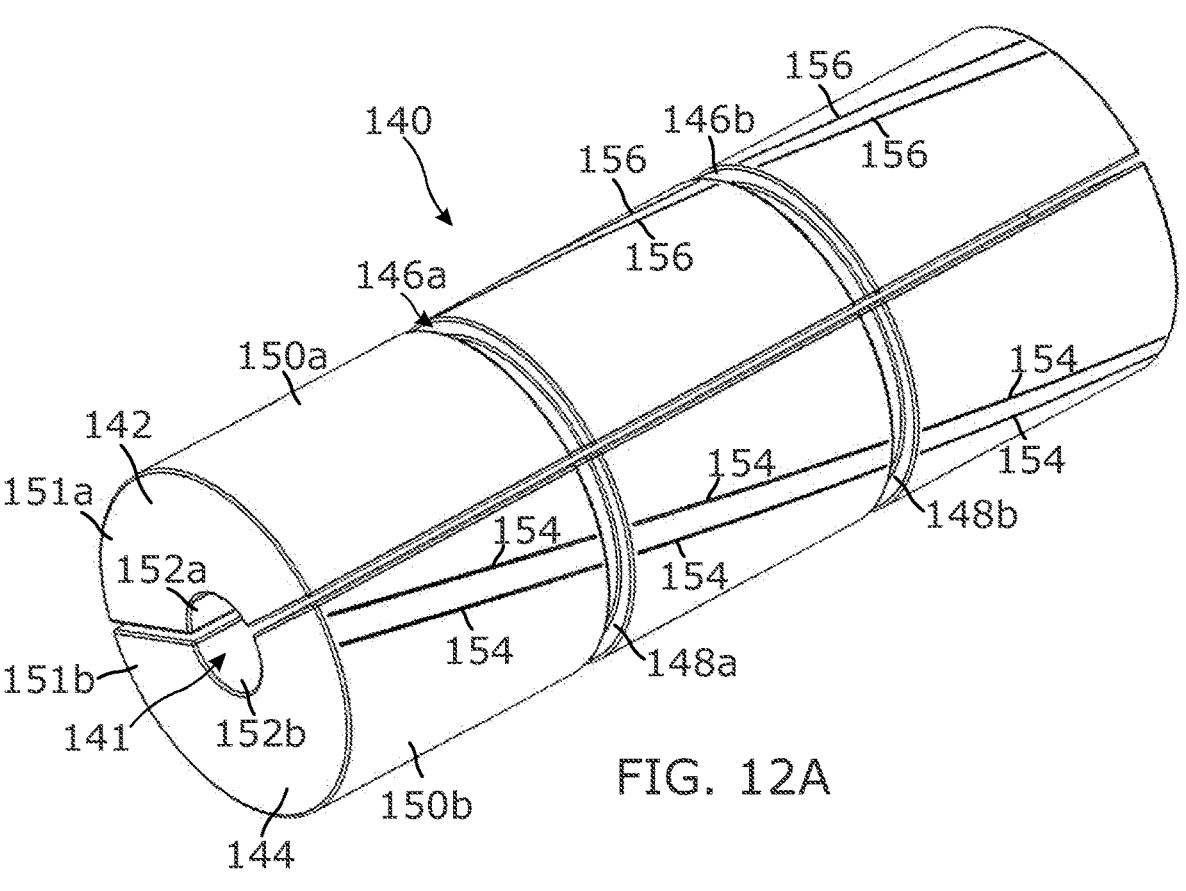
FIG. 12A illustrates a perspective view of a seventh example of the VIV strake shell.
Figure 12B:
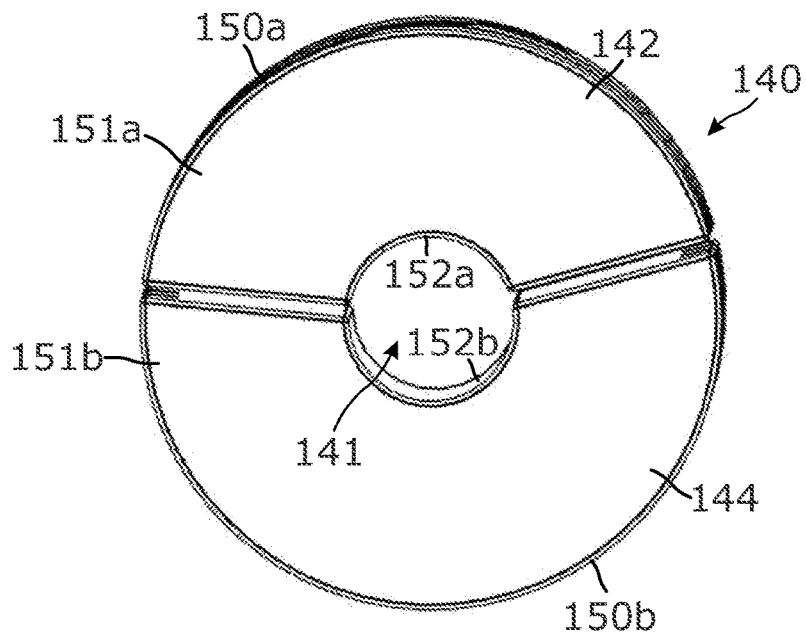
FIG. 12B illustrates a front view of the seventh example of the VIV strake shell.

FIGS. 12A and 12B illustrate perspective and front views of a seventh example of the VIV strake shell 140. The illustrated VIV strake shell 140 has a substantially cylindrical shape.

The VIV strake shell 140 may be formed from a plastics material, such as polyurethane or polyethylene. The VIV strake shell 40*a* may be formed from a different material from the VIV Strake fin 100*a*. The material from which the VIV strake shell 140 is formed may be more rigid than the material from which the VIV strake fin 100*a* is formed. For example, the elastic modulus of the material from which the VIV strake shell 40*a* is formed may be 150 MPa to 3 GPa.

The shell 140 defines a void 141 in which a conduit 82 may be located. The void 141 may be substantially cylindrical in shape. In use, a longitudinal/cylindrical axis of the conduit extends through the void 141 and may be aligned with the longitudinal/cylindrical axis of the shell 140.

The shell 140 comprises a first shell part 142 and a second shell part 144. The void 141 is partly defined by the first shell part 142, and partly defined by the second shell part 144. The shell 140 has an outer surface 150*a*, 150*b* and an inner surface 152*a*, 152*b*. Each of the outer surface 150*a*, 150*b* and the inner surface 152*a*, 152*b* may be curved. The inner surface 152*a*, 152*b* is partly defined by an inner surface 152*a* of the first shell part 142, and partly defined by an inner surface 152*b* of the second shell part 144. The outer surface 150*a*, 150*b* is partly defined by an outer surface 150*a* of the first shell part 142, and partly defined by an outer surface 150*b* of the second shell part 144.

In use, a longitudinal/cylindrical axis of the conduit 82 extends through the void 141 and may be aligned with the longitudinal/cylindrical axis of the shell 140. The inner surface 152*a*, 152*b* may be positioned adjacent to (and possibly in contact with) the curved outer surface of the conduit 82 when fitting the VIV strake shell 140 to the conduit 82.

In the illustrated example, the shell 140 further comprises substantially planar end faces. In other examples, the end faces might be inclined. Each end face is partly defined first shell part 142 and partly defined by the second shell part 144. One of the end faces 151*a*, 151*b* is visible in FIGS. 12A and 12B, partly defined by an end face 151*a* of the first shell part 142 and partly defined by an end face 151*b* of the second shell part 144.

The shell 140 includes a plurality of sets of apertures 154, 156. In the illustrated example there are first 154, second 156 and third sets of apertures, but only two sets of apertures 154, 156 can be seen. There are two apertures in each set. There may be more or fewer sets of apertures 154, 156 in other examples, and more than two apertures 154, 156 in each set. In the illustrated example, each aperture 154, 156 is in the form of an elongate slot. The orientation of a particular elongate slot 154, 156 is aligned with the orientation of each other elongate slot 154, 156, such that the slots 154, 156 in the set are parallel to one another.

Each set of apertures 154, 156 is arranged to form a portion of a helical shape, such that when a set of shells 140 are positioned/connected together along a conduit 82, the apertures 154, 156 define a plurality of helices extending around the outside of the shells 140.

The curved outer surface 150*a-b* of the shell 140 comprises a plurality of (circumferential) recesses 146*a-b*, 148*a-b*. The curved outer surface 150*a-b* of the shell 140 may be recessed radially inwardly in this regard. Each of the recesses 146*a-b*, 148*a-b* may extend around the entire circumference of the shell 140.

The recesses 146*a-b*, 148*a-b* are spaced longitudinally in the dimension defined by the longitudinal/cylindrical axis of the shell 140. Part of each recess 146*a-b*, 148*a-b* is defined by the outer surface 150*a* of the first shell part 142, and part of each recess 146*a-b*, 148*a-b* is defined by the outer surface 150*b* of the second shell part 144.

Each of the recesses 146*a-b*, 148*a-b* is for receiving a retainer 80. The retainer 80 is for securing the shell 140 to the conduit 82 and for securing the first and second shell parts 142, 144 together.

Figures 13A, 13B:
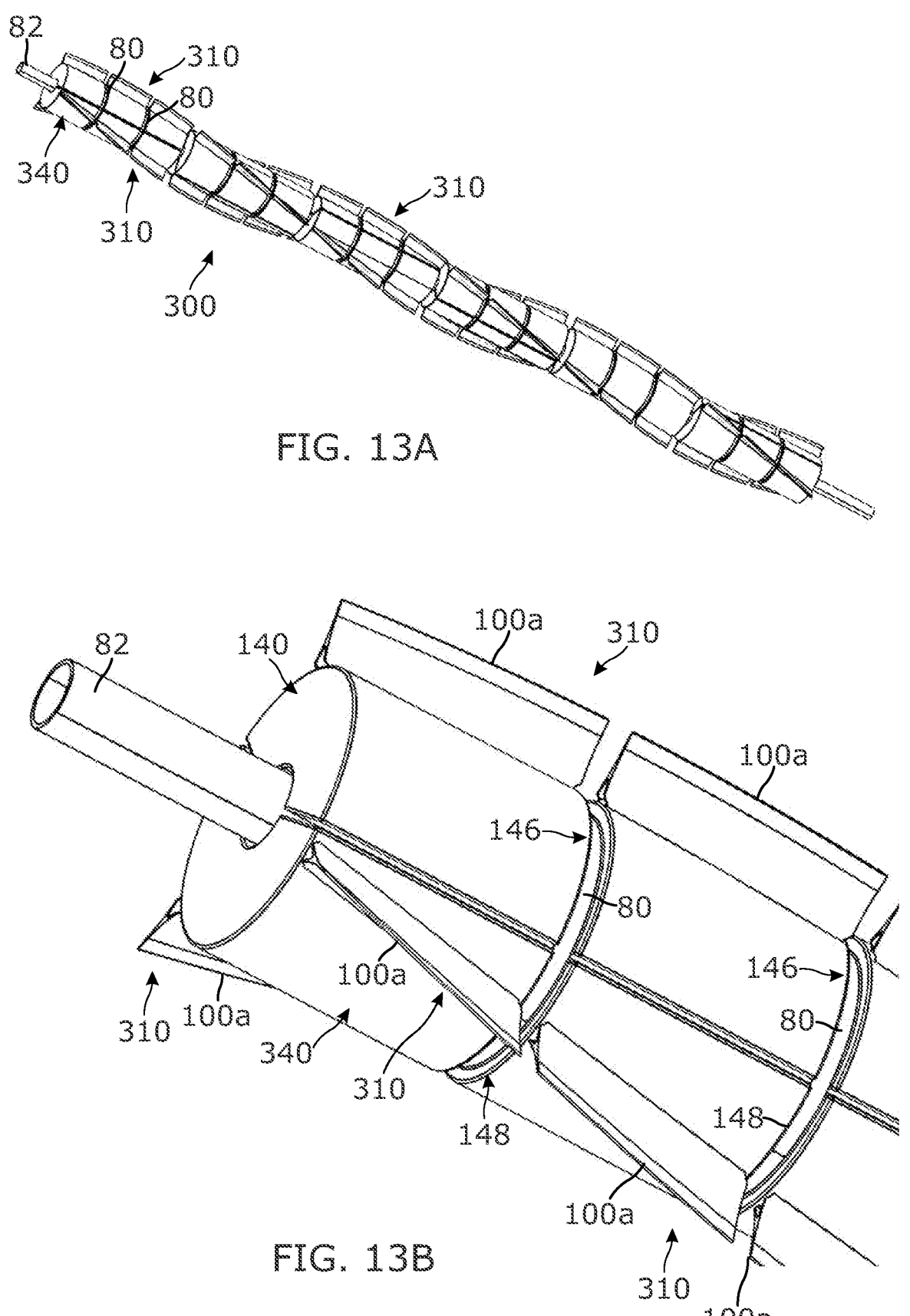
FIG. 13A illustrates a third example of a VIV strake arrangement comprising the seventh example of the VIV strake shell and the third example of the VIV strake fin.
FIG. 13B illustrates a magnified view of a portion of the third example of the VIV strake arrangement.

FIG. 13A illustrates a third example 300 of a VIV strake arrangement comprising the seventh example 140 of the VIV strake shell and the third example 100*a* of the VIV strake fin. FIG. 13B illustrates a magnified view of a portion of the third example 300 of the VIV strake arrangement. The VIV strake arrangement includes 300 comprises a plurality of VIV strake shells 340 and a plurality of VIV strake fins 310. In this example, each of the VIV strake shells 140 is the same as that illustrated in FIGS. 12A to 12C, but in other examples they may be different.

The VIV strake fins 310 are the same as that illustrated in FIGS. 11A to 11D. Each set of VIV strake fins 310 extends helically around the VIV strake shells 340. In this example there are three sets of VIV strake fins 340, but in other examples there might be more or fewer sets.

As mentioned above, the recesses 126*a*, 126*b*, 128*a*, 128*b* in each fin 100*a* are shaped to accommodate a retainer 80 for securing a VIV strake shell 140 to a conduit. A least a portion of each of the recesses 126*a*, 126*b*, 128*a*, 128*b* is located outside the outer surface 150*a*, 150*b*, when the fins 100*a* are located in the apertures 154, 156 of the shell 140. When the fins 100*a* are located in the shell 140, the recesses 126*a*, 126*b*, 128*a*, 128*b* provide sufficient clearance to insert the retainers 80 into the recesses 146*a-b*, 148*a-b* to bind the shell parts 142, 144 of the shell 140 together. The fins 100*a* don't abut each other in the examples illustrated in FIGS. 13A and 13B, but they may do so in other examples (in a similar manner to the fins 10*b* shown in FIG. 10).

In this example, buoyant material may be inserted into each VIV strake shell 140 to render the VIV strake arrangement 300 buoyant (e.g., buoyant in seawater). The buoyant material may, for example, be a polymer foam, a ceramic foam or a syntactic foam.

The fins 100*a* may be held in place by setting the fins 100*a* in the syntactic foam housed within the shell 140. At least a portion of the legs 116, 118 of the fins 100*a* are located inside the shell 140 when the fins 110*a* are located in the apertures 154, 156. Those portions of the legs 116, 118 include the anchors 120, 122. The anchors 120, 122 may be located in the syntactic foam to anchor the fins 100*a* securely.

Figure 14:
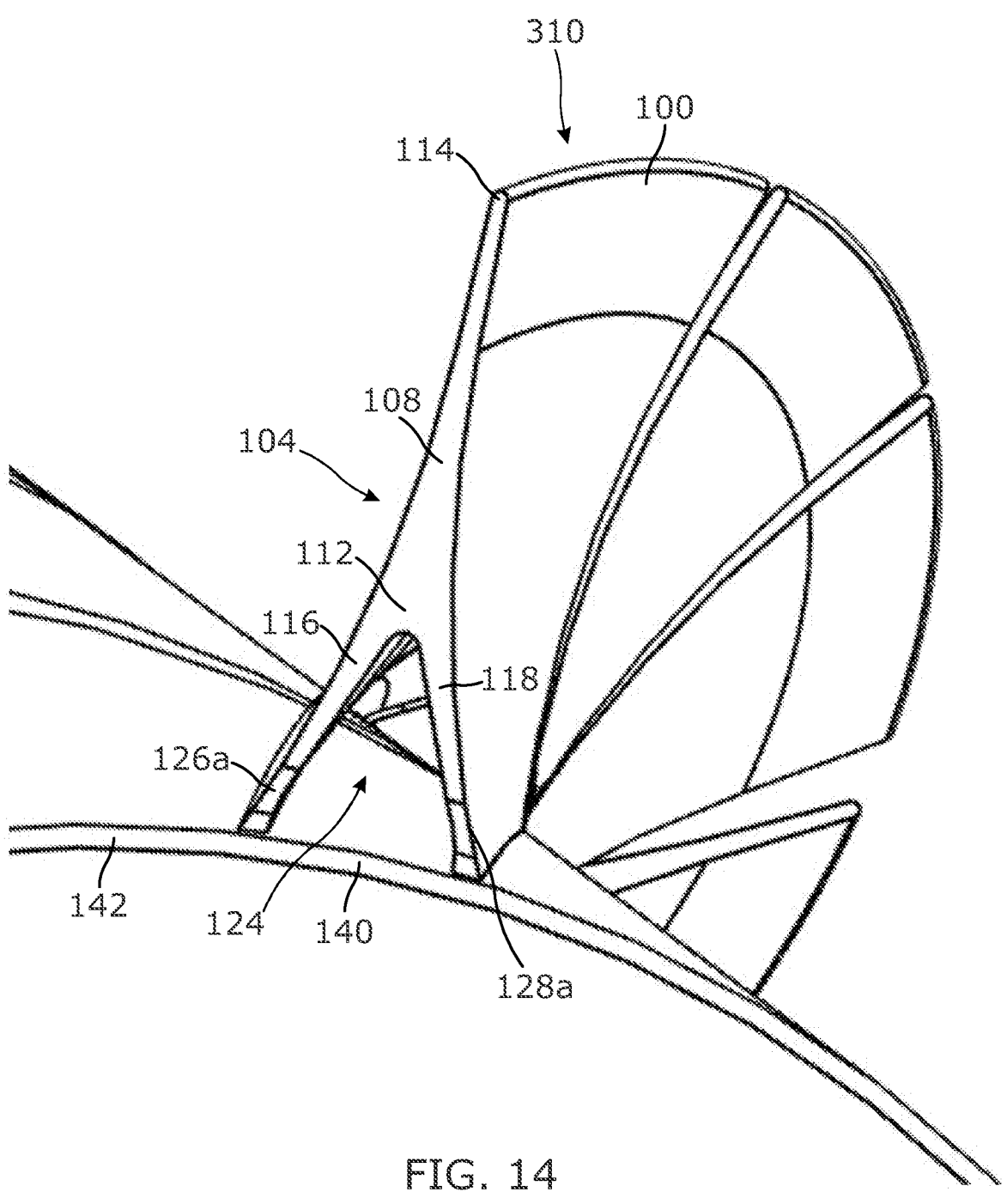
FIG. 14 illustrates a magnified view of a portion of the third example of the VIV strake fin located in the seventh example of the VIV strake shell.

FIG. 14 illustrates a magnified view of a portion of VIV strake arrangement 300 showing fins 100*a* anchored securely into a shell 140. FIG. 14 illustrates that at least a portion of the void 124 in each of the fins 100*a* is located outside the VIV strake shell 140. That is, the void 124 is located adjacent the outer surface 150 of the shell 140. In these examples, a majority of the void 124 may be located outside the VIV strake shell 140.

As explained above, an advantage of the void 124 within each of the fins 100*a* is that the flexible legs 116, 118 of the fins 100*a* may temporarily flex into the void 124 as a conduit 82 including the arrangement 300 is moved along the rollers onboard a ship. Advantageously, this helps to avoid permanent damage being caused to the fins 100*a*, providing a more effective VIV strake arrangement 300 in use.

Figures 15A, 15B:
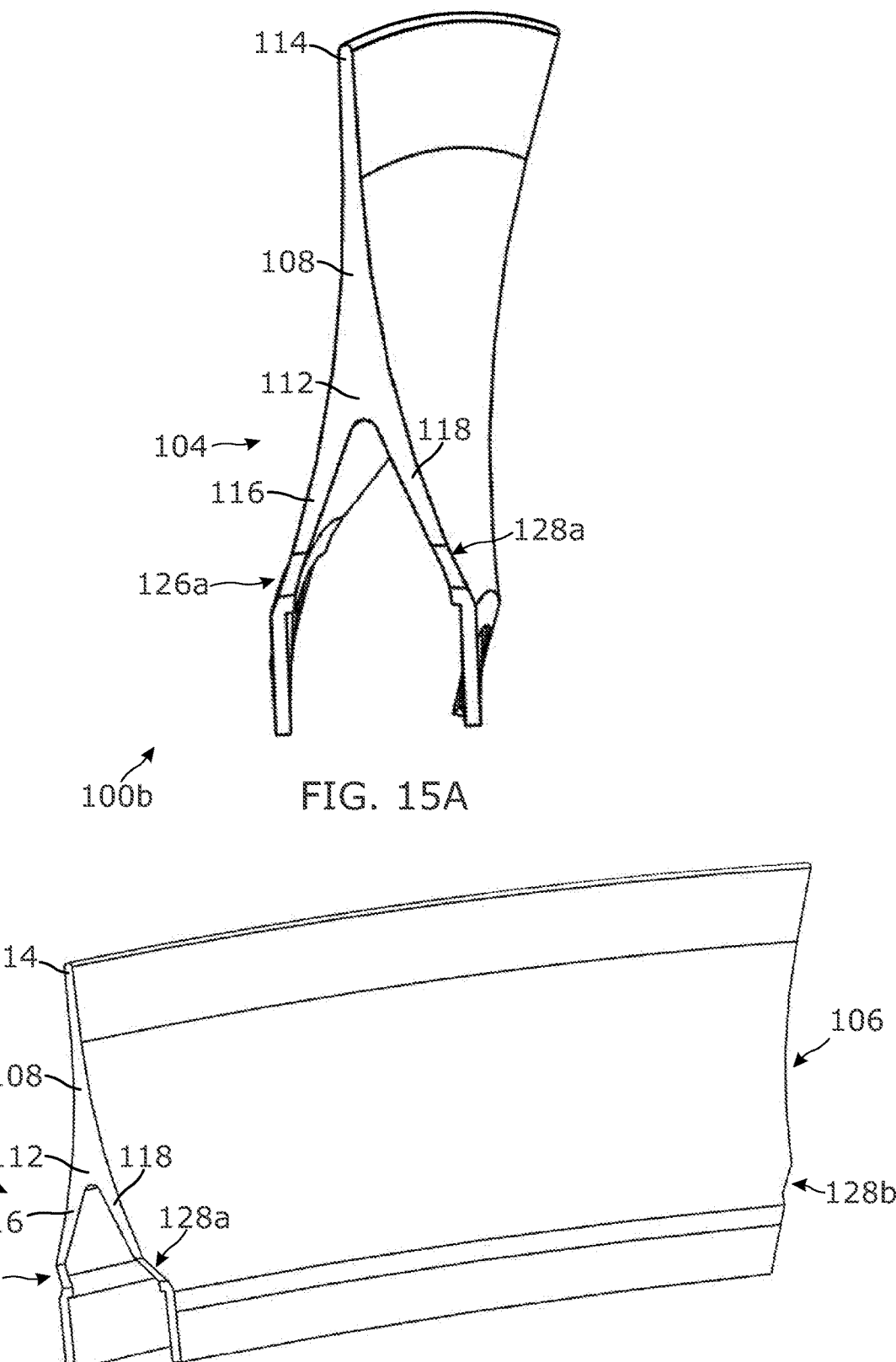
FIG. 15A illustrates a front view of a fourth example of the VIV strake fin.
FIG. 15B illustrates a perspective view of the fourth example of the VIV strake

FIGS. 15A and 15B a front view and a perspective view of a fourth example 100*b* of the VIV strake fin. The fourth example 100*b* of the VIV strake fin is the same as the third example 100*a*, other than that the anchors 120, 122 are not present. The fin 100*b* may be adequately coupled to the shell 140 (e.g., due to buoyant material bonding to the legs 116, 118 of the fin 100*b* and the inside surfaces of the shell 140), such that the anchors 120, 122 are unnecessary.

Figures 16A, 16B:
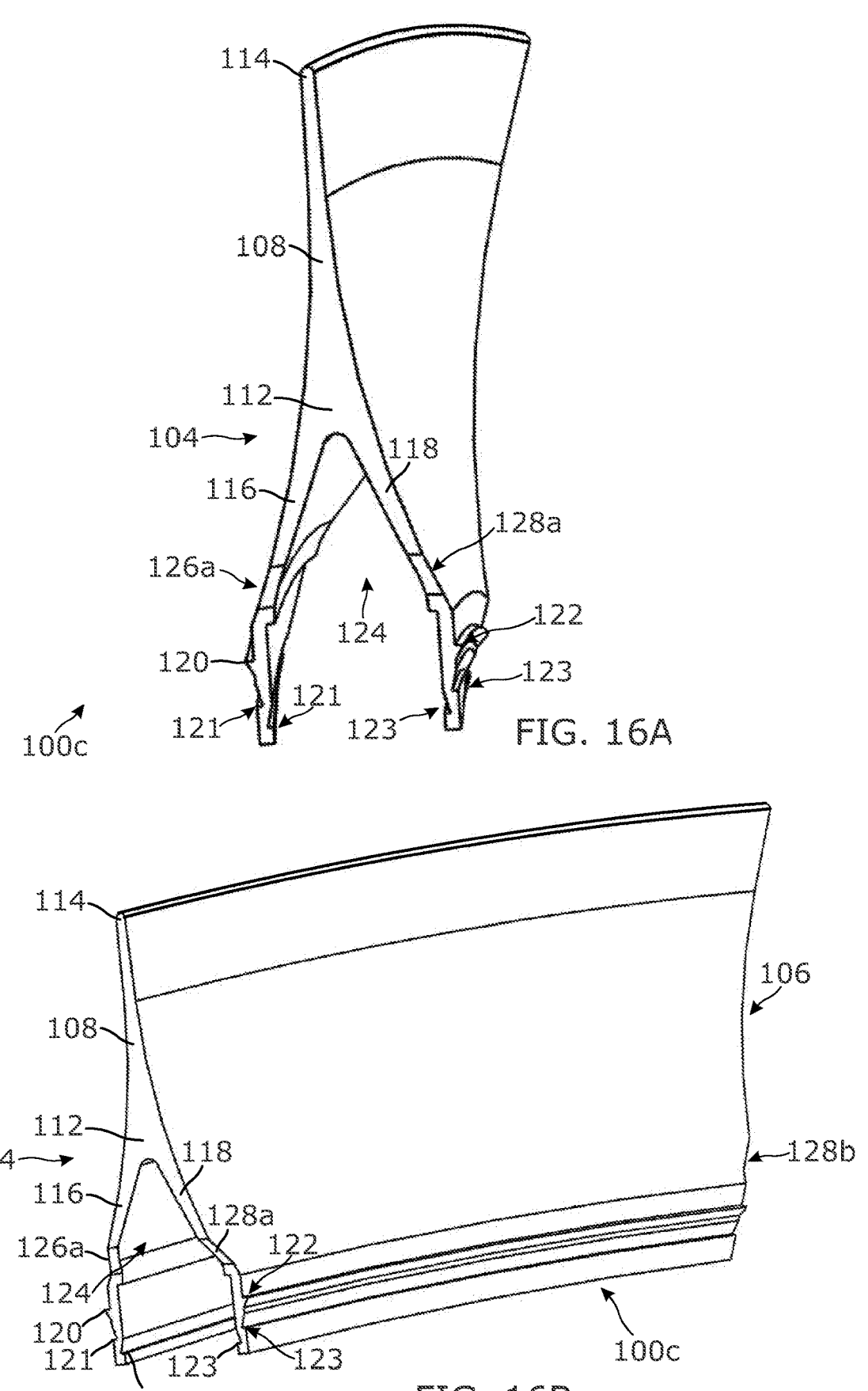
FIG. 16A illustrates a front view of a fifth example of the VIV strake fin.
FIG. 16B illustrates a perspective view of the fifth example of the VIV strake fin.

FIGS. 16A and 16B illustrate a front view and a perspective view of the fifth example 100*c* of a VIV strake fin. The fifth example 100*c* of the VIV strake fin is the same as the third example 100*a*, other than that the anchors 121-123 are different. Rather than multiple "positive anchors" (projections) being located on the outer surface of each leg 116, 118, a single positive anchor 120, 122 is located on the outer surface of each leg 116, 118 and a "negative anchor" (a recess) 121, 123 is located on the outer surface and the inner surface of each leg 116, 118. Any combination of positive anchors and negative anchors may be provided on each leg 116, 118.

Figures 17A, 17B:
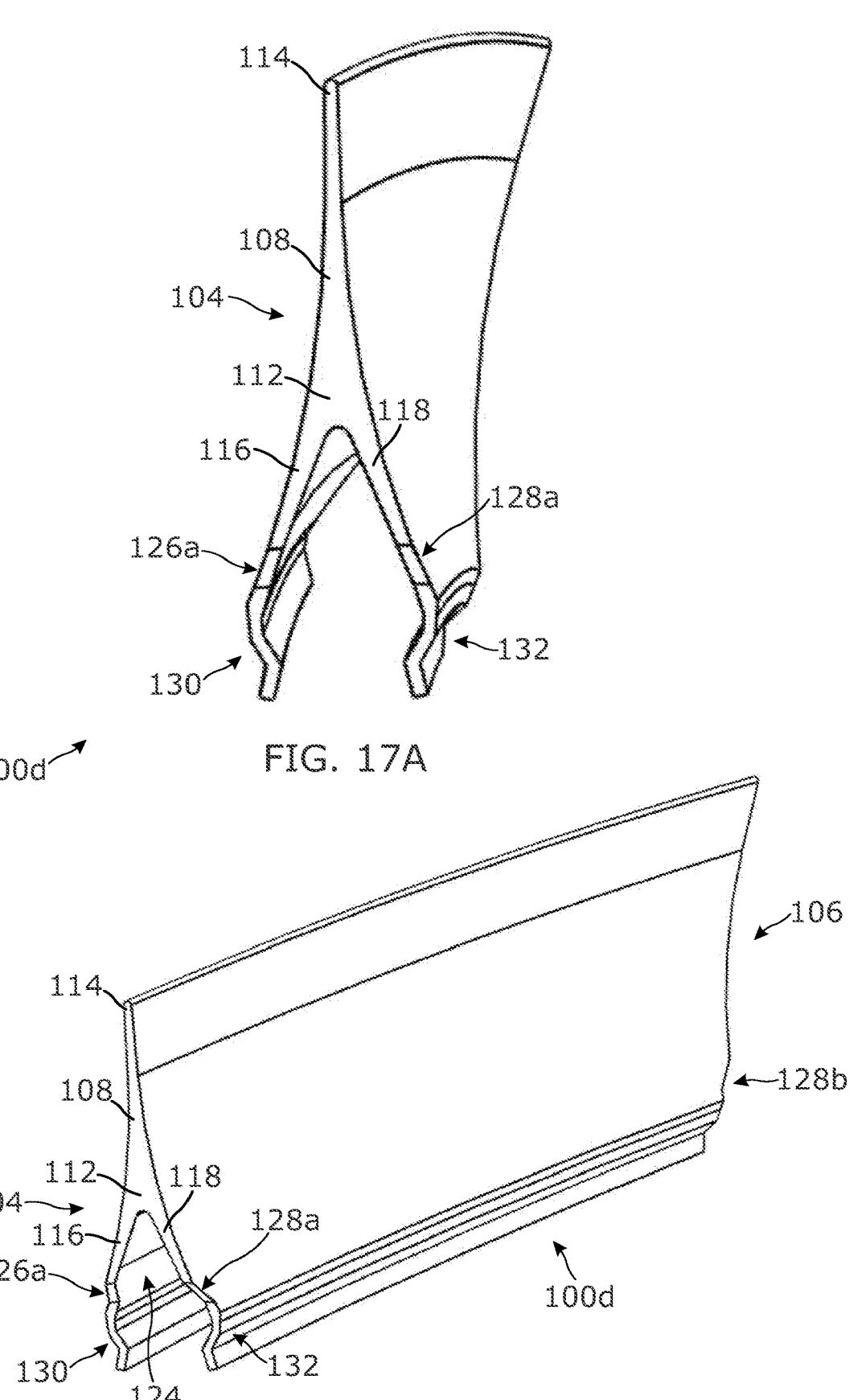
FIG. 17A illustrates a front view of a sixth example of the VIV strake fin.
FIG. 17B illustrates a perspective view of the sixth example of the VIV strake fin.

FIGS. 17A and 17B illustrate a front view and a perspective view of a sixth example 100*d* of the VIV strake fin. The sixth example 100*d* of the VIV strake fin is similar to fourth example in that no anchors 120, 122 are present on the legs 116, 118. It differs from the fourth example in that, in the plane defined by the height and width dimensions of the fin 100*d*, each leg 116, 118 bends as it extends downwardly from the recessed portions 126*a*, 126*b*, 128*a*, 128*b*. This bending may enable the fin 100*a* to be coupled more securely to the shell 140. The bending may also mean that it is unnecessary have an anchor that is located above the shell 140, unlike in the example of the fin 100*b* illustrated in FIGS. 15A and 15B.

Figure 18A:
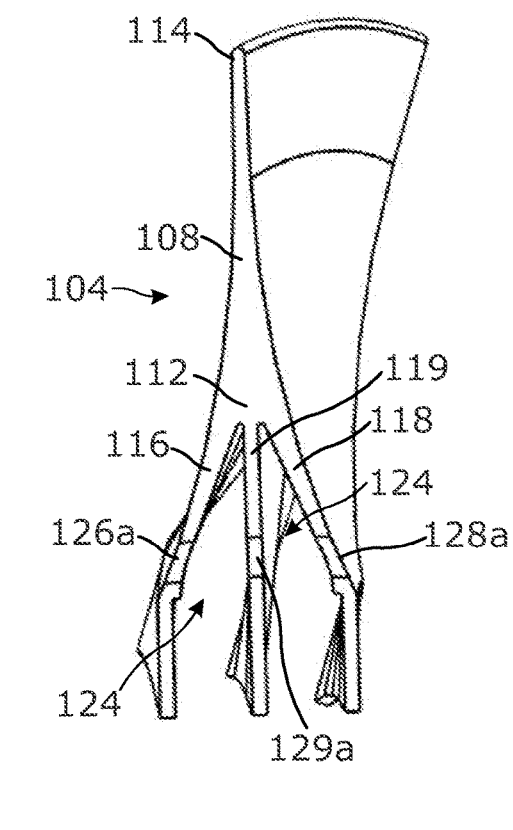
FIG. 18A illustrates a front view of a seventh example of the VIV strake fin.
Figure 18B:
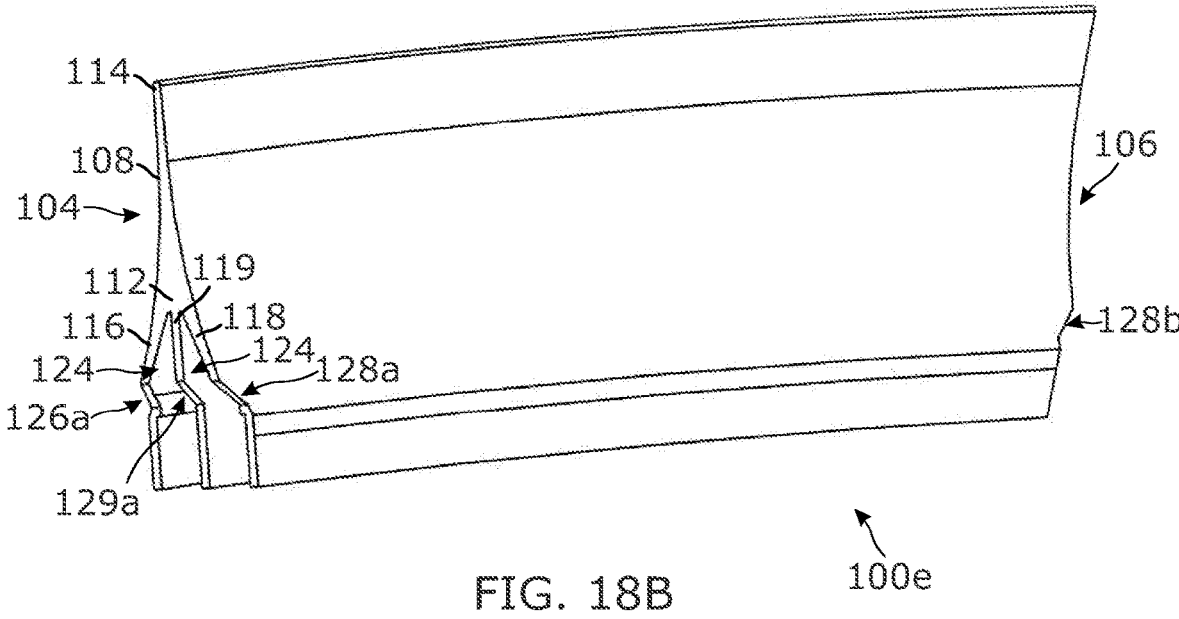
FIG. 18B illustrates a front perspective view of the seventh example of the VIV strake fin.
Figure 18C:
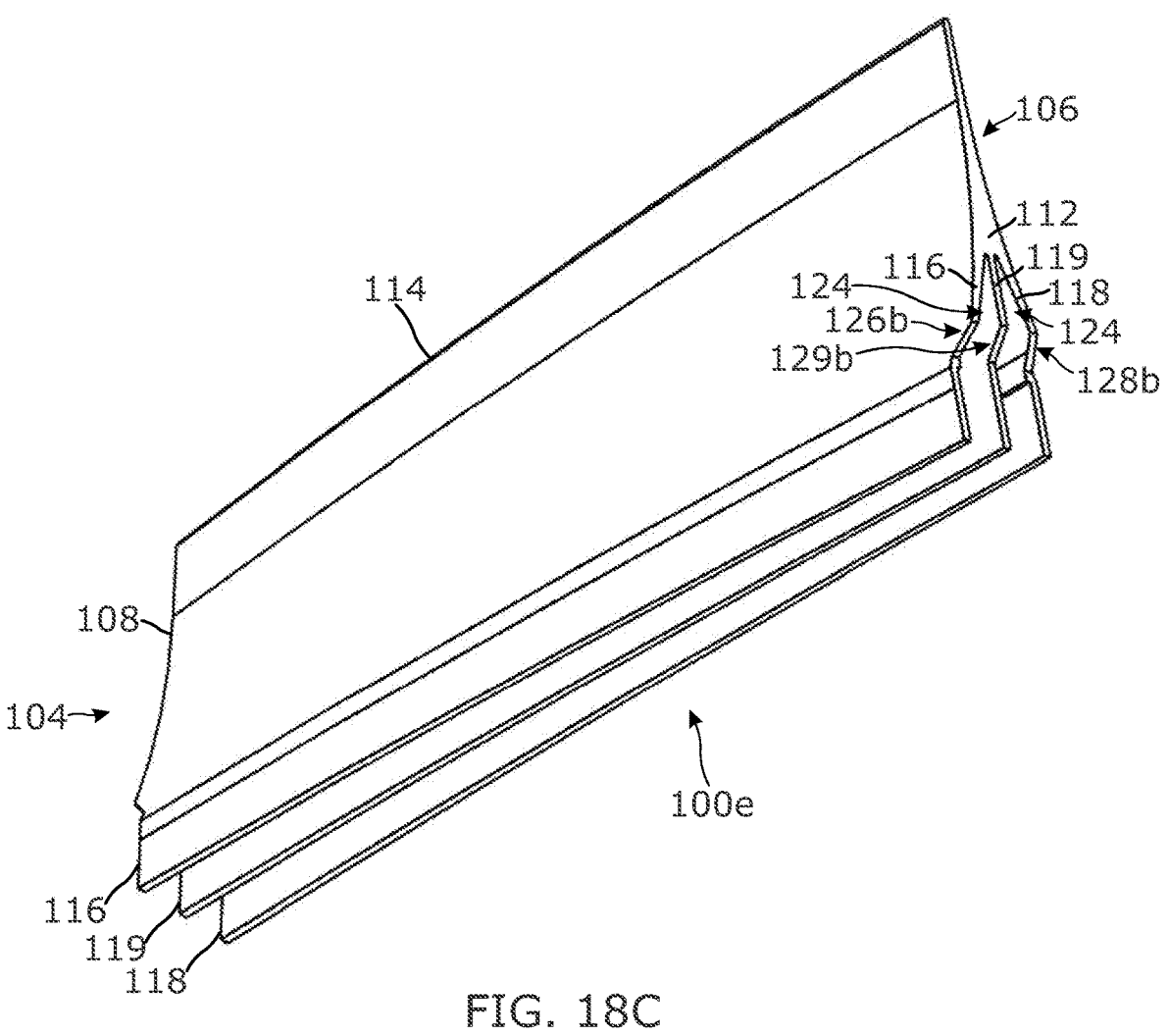
FIG. 18C illustrates an underside perspective view of the seventh example of the VIV strake fin.

FIG. 18A, FIGS. 18B and 18C illustrate a front view, a front perspective view and an underside perspective view of a seventh example 100*e* of the VIV strake fin. The seventh example 100*e* of the VIV strake fin is the same as fourth example in that no anchors 120, 122 are present on the legs 116, 118. It differs in that an additional, third leg 119 is present between the other legs 116, 118. This means that there are a plurality of voids 124. Each void 124 has a portion having a substantially triangular-shaped cross section. In order to enable the shell 140 to receive the fin 100*e*, each set of apertures in the shell 140 would include three apertures—one for each leg 116, 118, 119.

It will be appreciated that the features of the fins 100*a-e* illustrated in FIGS. 11A to 11D and 15A to 18C could be combined. For example, any number of positive or negative anchors could be included on some or all of the legs 116, 118, 119 in the sixth and seventh examples of the fin 100*d*, 100*e*. The features of the fins 100*a*-100*e* could be included in the first example of the fin 10*a*. For instance, the fin 10*a* could include three legs, as per the seventh example of the fin 100*e*. In such circumstances, each set of apertures 54*a-b*, 56*a-b*, 58*a-b* would include three apertures.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

I claim:

1. A vortex-induced vibration (VIV) strake arrangement, comprising:
   a VIV strake shell for location on a conduit, comprising a first elongate slot and a second elongate slot; and
   a VIV strake fin, for coupling to the VIV strake shell, comprising:
   a flexible fin tip,
   a flexible first leg extending from the flexible fin tip,
   a flexible second leg extending from the flexible fin tip, and
   at least one anchor arranged to resist extraction of the VIV strake fin from the VIV strake shell,
   wherein the VIV strake fin is shaped such that when the VIV strake fin is connected to the VIV strake shell and the VIV strake shell is located on the conduit, the flexible first and second legs extend from the flexible fin tip and define a void between the flexible first and second legs, and
   wherein the first elongate slot is for receiving at least part of the flexible first leg and the second elongate slot is for receiving at least part of the flexible second leg.

2. The VIV strake arrangement as claimed in claim 1, wherein the VIV strake fin is shaped such that when the VIV strake fin is connected to the VIV strake shell and the VIV strake shell is located on the conduit, at least a portion of the void is located outside the VIV strake shell.

3. The VIV strake arrangement as claimed in claim 1, wherein the VIV strake fin is shaped such that when the VIV strake fin is connected to the VIV strake shell and the VIV strake shell is located on the conduit, the flexible first and second legs diverge as they extend from the flexible fin tip.

4. The VIV strake arrangement as claimed in claim 1, wherein the VIV strake fin has a height dimension, a length dimension and a width dimension, wherein, optionally, the length dimension is greater than the height dimension and wherein, optionally, the height dimension is greater than the width dimension.

5. The VIV strake arrangement as claimed in claim 4, wherein the height dimension of the void is at least 10% of the height dimension of the VIV strake fin.

6. The VIV strake arrangement of claim 4, wherein the flexible first and second legs diverge in the width dimension.

7. The VIV strake arrangement as claimed in claim 1, wherein each of the first and second legs defines a recess shaped to accommodate a retainer for securing the VIV strake shell to the conduit.

8. The VIV strake arrangement as claimed in claim 1, wherein at least part of the void has a substantially triangular cross section.

9. The VIV strake arrangement as claimed in claim 1, wherein the at least one anchor is at least one flange extending from at least one of the flexible first leg and the flexible second leg.

10. The VIV strake arrangement as claimed in claim 1, wherein the VIV strake shell comprises a tongue portion between the first and second elongate slots.

11. The VIV strake arrangement as claimed in claim 1, wherein the VIV strake fin has a height dimension, a length dimension and a width dimension, wherein the height dimension is greater than the width dimension.

12. The VIV strake arrangement as claimed in claim 1, wherein the VIV strake shell comprises a plurality of sets of elongate slots.

13. The VIV strake arrangement as claimed in claim 12, wherein the orientation of a particular elongate slot in a set is aligned with the orientation of each other elongate slot in the set, such that the elongate slots in the set are parallel to each other.

14. The VIV strake arrangement as claimed in claim 1, wherein the VIV strake shell comprises at least one connector configured to connect the VIV strake shell to another adjacent VIV strake shell.

15. The VIV strake arrangement as claimed in claim 14, wherein the at least one connector comprises a first connector and a second connector, wherein the first connector is for connection to a connector of the same form as the second connector on a different, adjacent VIV strake shell and the second connector is for connection to a connector of the same form as the first connector on another, different, adjacent VIV strake shell.

* * * * *